(12) United States Patent
Iriarte Lopez et al.

(10) Patent No.: US 11,555,399 B1
(45) Date of Patent: Jan. 17, 2023

(54) METHODS AND SYSTEMS FOR PROCESSING TIME-SERIES DATA USING HIGHER ORDER CHANNELS TO IDENTIFY EVENTS ASSOCIATED WITH DRILLING, COMPLETION AND/OR FRACTURING OPERATIONS AND ALTER DRILLING, COMPLETION AND/OR FRACTURING OPERATIONS BASED THEREON

(71) Applicant: Well Data Labs, Inc., Denver, CO (US)

(72) Inventors: Jessica G. Iriarte Lopez, Denver, CO (US); Alberto J. Ramirez Ramirez, Denver, CO (US)

(73) Assignee: Well Data Labs, Inc., Denver, CO (US)

( * ) Notice: Subject to any disclaimer, the term of this patent is extended or adjusted under 35 U.S.C. 154(b) by 355 days.

(21) Appl. No.: 16/850,972

(22) Filed: Apr. 16, 2020

Related U.S. Application Data

(60) Provisional application No. 62/953,020, filed on Dec. 23, 2019, provisional application No. 62/937,068, filed on Nov. 18, 2019, provisional application No. 62/834,841, filed on Apr. 16, 2019.

(51) Int. Cl.
| | |
|---|---|
| *E21B 47/06* | (2012.01) |
| *E21B 43/267* | (2006.01) |
| *G01L 11/00* | (2006.01) |

(52) U.S. Cl.
CPC ............ *E21B 47/06* (2013.01); *E21B 43/267* (2013.01); *G01L 11/00* (2013.01)

(58) Field of Classification Search
CPC .............................. E21B 47/06; E21B 43/267
See application file for complete search history.

(56) References Cited

U.S. PATENT DOCUMENTS

| | | | | |
|---|---|---|---|---|
| 8,061,427 B2* | 11/2011 | Jackson | ................ | E21B 43/006 166/250.1 |
| 10,294,768 B2* | 5/2019 | Mazrooee | ............... | E21B 47/06 |
| 11,193,367 B2* | 12/2021 | Jin | ........... | E21B 47/06 |
| 11,299,980 B2* | 4/2022 | Felkl | ..................... | G01V 99/005 |
| 11,313,211 B2* | 4/2022 | Johnson | ................ | E21B 43/26 |
| 11,365,617 B1* | 6/2022 | Haustveit | ................ | E21B 47/06 |
| 2019/0310386 A1* | 10/2019 | Quan | .................... | G01V 1/301 |

* cited by examiner

*Primary Examiner* — Nguyen Q. Ha
(74) *Attorney, Agent, or Firm* — Polsinelli PC; Gregory P. Durbin

(57) ABSTRACT

A well completion processing system to identify breakdown pressure, diverter events and offset pressure, in time sequenced fracture data, and use the identification of the same in the modification or adjustment of parameters associated with completion, as well as the display of information in a graphical form, such as an interface. In various examples, the processing system employs higher order channels in the processing of the same.

14 Claims, 17 Drawing Sheets

METHODS AND SYSTEMS FOR PROCESSING TIME-SERIES DATA USING HIGHER ORDER CHANNELS TO IDENTIFY EVENTS ASSOCIATED WITH DRILLING, COMPLETION AND/OR FRACTURING OPERATIONS AND ALTER DRILLING, COMPLETION AND/OR FRACTURING OPERATIONS BASED THEREON

CROSS-REFERENCE TO RELATED APPLICATIONS

This application is related to and claims priority under 35 U.S.C. § 119 from U.S. Provisional Application No. 62/834,841 filed Apr. 16, 2019 entitled "Breakdown Pressure Flag Automation," the entire contents of which are fully incorporated by reference herein for all purposes. This application is also related to and claims priority under 35 U.S.C. § 119 from U.S. Provisional Application No. 62/937,068 filed Nov. 18, 2019 entitled "Methods and Systems for Processing Time-Series Data Using Higher Order Channels," the entire contents of which are fully incorporated by reference herein for all purposes. This application is also related to and claims priority under 35 U.S.C. § 119 from U.S. Provisional Application No. 62/953,020 filed Dec. 23, 2019 entitled "Methods and Systems for Processing Time-Series Data Using Higher Order Channels," the entire contents of which are fully incorporated by reference herein for all purposes.

TECHNICAL FIELD

Aspects of the present disclosure involve analysis of time sequenced completions data to automatically identify events or extract useful parameters from the data, such as a breakdown pressure, diverter and pressure response from the same, and offset pressure response, of a sequence within the data and using higher order channels.

BACKGROUND

Time-series data is used in various domains of the oil and gas industry, such as drilling, completions and hydraulic fracturing. Generally, time-series data includes logs and/or streaming data from various sensors dispersed throughout a well site. The time-series data is used to identify and respond to events, plan drilling, treatment, hydraulic fracturing, and other operations, and perform various other important drilling, completion and hydraulic fracturing related activities.

However, time-series data is often treated inconsistently and/or processed through manual analysis, leading to inconsistent results and application of the results. Moreover, manual processing can only discern relatively obvious features of the time-series data and is limited to the channels native to the time-series data unless significant time and effort is dedicated to further processing the data. In addition, even seemingly obvious features can be missed or mis-identified in unconventional formations where data may act quite differently from conventional formations, where different operators apply different parameters resulting in different behavior and accordingly different data behavior, and the like. As a result, accuracy and speed of the analysis cannot take into consideration hidden features, such as higher order or derived data channels, and so are reduced or incomparable as a consequence.

It is with these observations in mind, among others, that various aspects of the present disclosure were conceived.

SUMMARY

Aspects of the present disclosure involves computer implemented methods, processing systems and computer executable instructions set forth on a non-transitory computer readable medium. Various aspects involve obtaining well data, which may be time series data, from various sensors associated with drilling operations, and completion and hydraulic fracturing operations. The sensors and data may be obtained from downhole equipment such as measurement while drilling sensors, sensors along the well bore, sensors positioned within stage, and from sensors and equipment above ground such as associated with pump trucks and the like.

In one example, the method, system and computer executable instructions access well data comprising a series of pressure values of a well corresponding to a time when a well is being hydraulically fractured. The system generates a series of rate of change of pressure values for the series of pressure values and identifies a peak value from the series of rate of change of pressure values.

In another example, aspects of the present disclosure involve a non-transitory computer readable medium comprising computer executable instructions what, when executed by a processor, perform the following: access well data comprising a series of treating pressure values and a series of corresponding slurry rate values for a time while a well is being hydraulically fractured; generate a series of rate of change of treating pressure values for the series of treating pressure values; generate a series of corresponding rate of change of slurry rate values for the series of slurry rate values; and set a breakdown pressure for a peak value in the series of rate of change of treating pressure values when the rate of slurry rate value corresponding to the peak value indicates a substantially constant slurry rate.

In another example, aspects of the present disclosure involve a non-transitory computer readable medium comprising computer executable instructions what, when executed by a processor, perform the following: access well data comprising a series of treating pressure values for a well being hydraulically fractured; access well data comprising a series of corresponding slurry rate values for a time while a well is being hydraulically fractured; generate a scaled series of rate of change of treating pressure values for the series of treating pressure values; generate a scaled series of corresponding rate of change of slurry rate values for the series of slurry rate values, with the scaled series of rate of change of treating pressure values scaled to match the scaled series of corresponding rate of change of slurry rate values; combine the scaled series of corresponding rate of change of slurry rate values for the series of slurry rate values, with the scaled series of rate of change of treating pressure values and set the diverter as a highest peak in the combined channel where the rate of change of the slurry rate indicates a substantially constant slurry rate.

In another example, aspects of the present disclosure involve a non-transitory computer readable medium comprising computer executable instructions what, when executed by a processor, perform the following: access a series of offset pressure values from an offset well; access a series of corresponding treating pressure values for a time while a well is being hydraulically fractured in a same formation as the offset well; generate a second derivate channel for the series of offset pressure values from the offset well; identify values in the second derivate channel corresponding with a time window when a stage is being completed in the active well and indicating a positive change in the offset pressure; and generate a fracture interference pressure response based on the positive change in the offset pressure. The instructions may further involve generate the fracture interference pressure response based on a difference between a low offset pressure within the time window and high offset pressure within the time window.

These and other aspects of the present disclosure are discussed further below.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters may refer to the same parts or similar throughout the different views. It is intended that the embodiments and figures disclosed herein are to be considered illustrative rather than limiting.

DETAILED DESCRIPTION

Aspects of the present disclosure involve a method and system for automating the identification of breakdown pressure, diverter events and offset pressure, in time sequenced fracture data. Unlike previous methods or workflows to automate various selections, the disclosed breakdown pressure flag automation, diverter and offset pressure, use a heuristic approach in lieu of complex machine learning techniques, although machine learning could be applied to further process the data or supplement the techniques discussed herein. As the breakdown, diverter, and offset pressure data behavior may be diverse due to the different data sources such as varying pumping schedules, formations, service providers, etc., achieving a method to find a "constant pattern" across the dataset may be advantageous to data analysis procedures.

Figure 1:
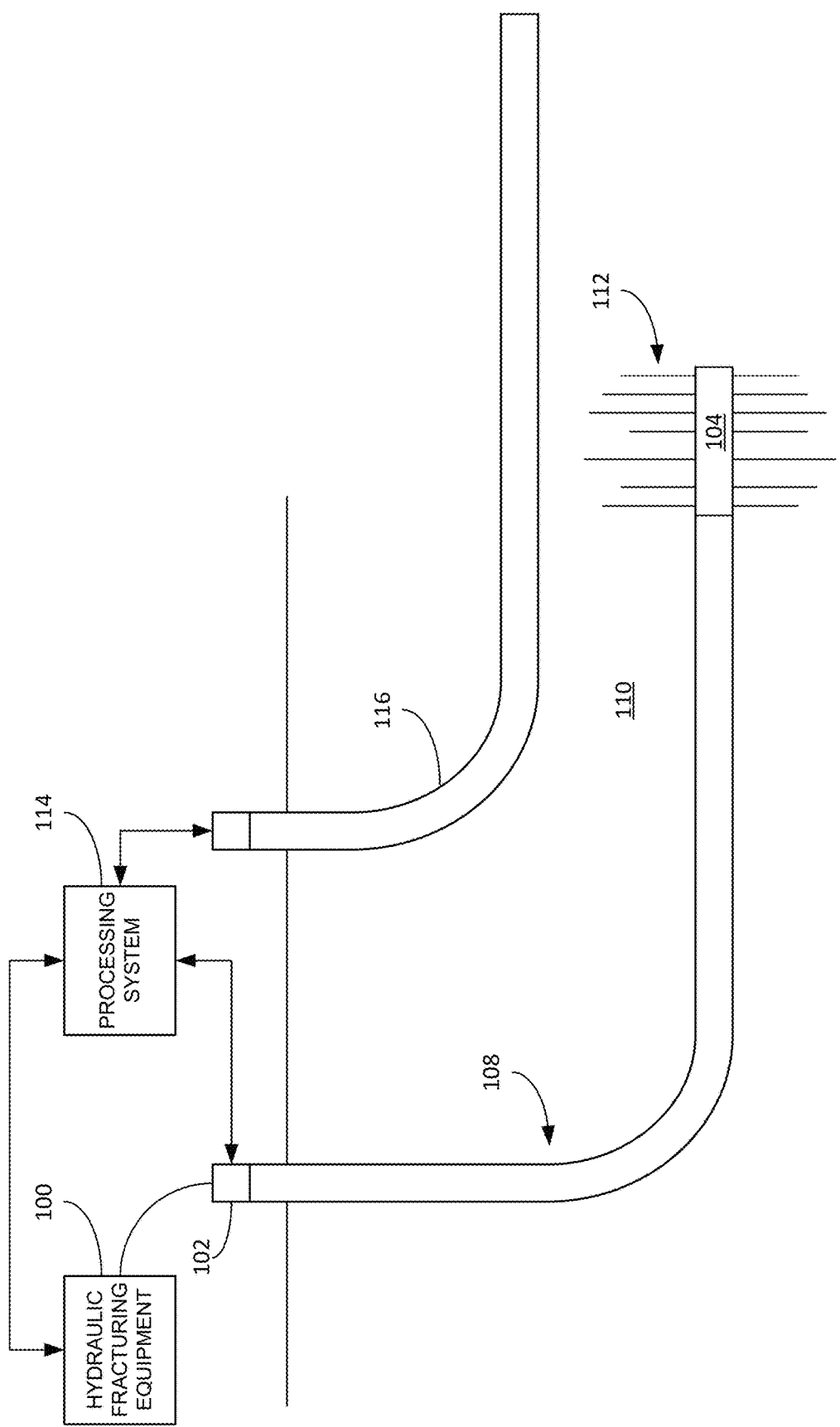
FIG. 1 is a system diagram illustrating a processing system coupled with a hydraulic fracturing system coupled with a well to hydraulic fracture a stage of the well, with the processing system to collect well processing data and process the same, according to one embodiment of the present application.

FIG. 1 is a system diagram according to aspects of the present disclosure. The system diagram is representative of a hydraulic fracture system 100 operably coupled with a well head 102, and set up to hydraulically fracture stages 104 of a horizontal section 106 of a wellbore 108. The hydraulic fracturing equipment may include pump trucks, sources of water (e.g., water trucks), and sources of proppant, diverter, and other substances that may be combined with water and injected into the well as part of the fracturing process. In some configurations, a pump truck is connected to the well head 102 and pumps, under controlled pressure and rate, the hydraulic fracturing fluid into the well which flows through a well casing (not shown) to the stage 104 being hydraulic fractured, and the fluid fractures the formation 110 surrounding the stage at perforations formed in the casing to form fractures 112. In some systems discussed herein, data and interactions with an offset well 116 may further be assessed. The offset well may be fitted with various possible sensors for measuring pressure, e.g., tubing pressure in one example, within the well or within some portion or portions of the well. The well and the equipment involved in the hydraulic fracturing process may include sensors, gauges, and other devices to monitor and record data associated with the hydraulic fracturing processes. The data may then be reported and stored at a processing system 114. The processing system may involve one or more computing devices, at the well site or remote therefrom, and combinations of the same. The processing system may be in wired or wireless communication with various aspects of the well and/or the fracturing equipment.

Breakdown Pressure

Breakdown pressure is the pressure at which fluid injected into a perforated borehole fractures the formation and allows fluid to open the fractures. Hydraulic fracturing, as would be expected, is generally conducted at or above the breakdown pressure of the formation surrounding the borehole. The breakdown pressure is also used to obtain formation stress measurements. In some instances, the maximum horizontal stress can be calculated from the breakdown pressure, the minimum principal stress and the properties of the rocks of the drilled formation. When interpreting micro-hydraulic fracturing data for in-situ stress determinations, the value of the breakdown pressure (on a first or subsequent injection cycle) is generally used in conjunction with the instantaneous shut-in pressure.

Figure 2:
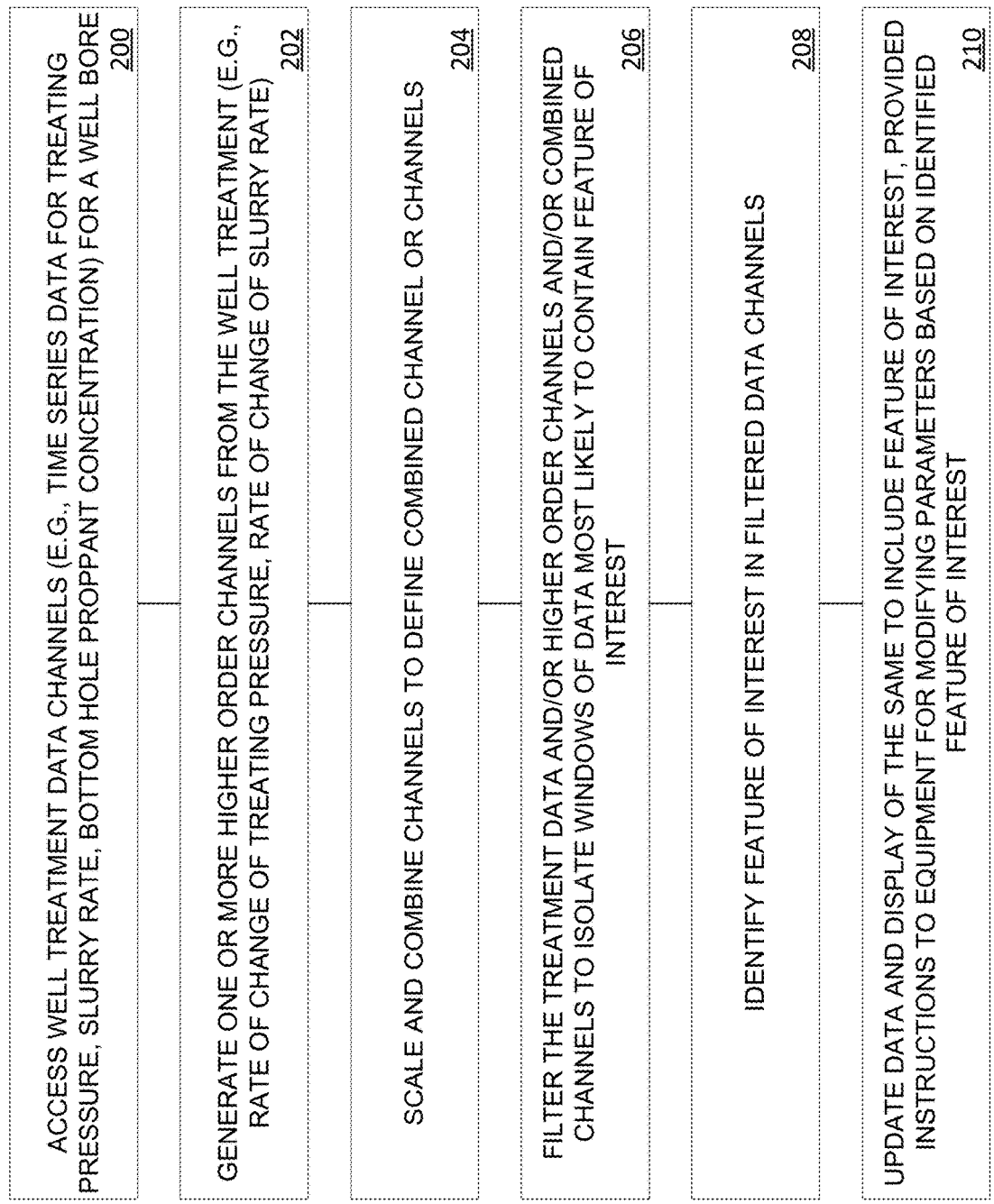
FIG. 2 is a flowchart illustrating one method of processing and acting on well treatment data according to one embodiment of the present application.

FIG. 2 is a flow diagram illustrating operations involved in various embodiments of the present disclosure. In various embodiments, operations may be rearranged, operations may not be performed etc. Additionally, various embodiments may perform operations differently or add operations as discussed herein.

Figure 3:
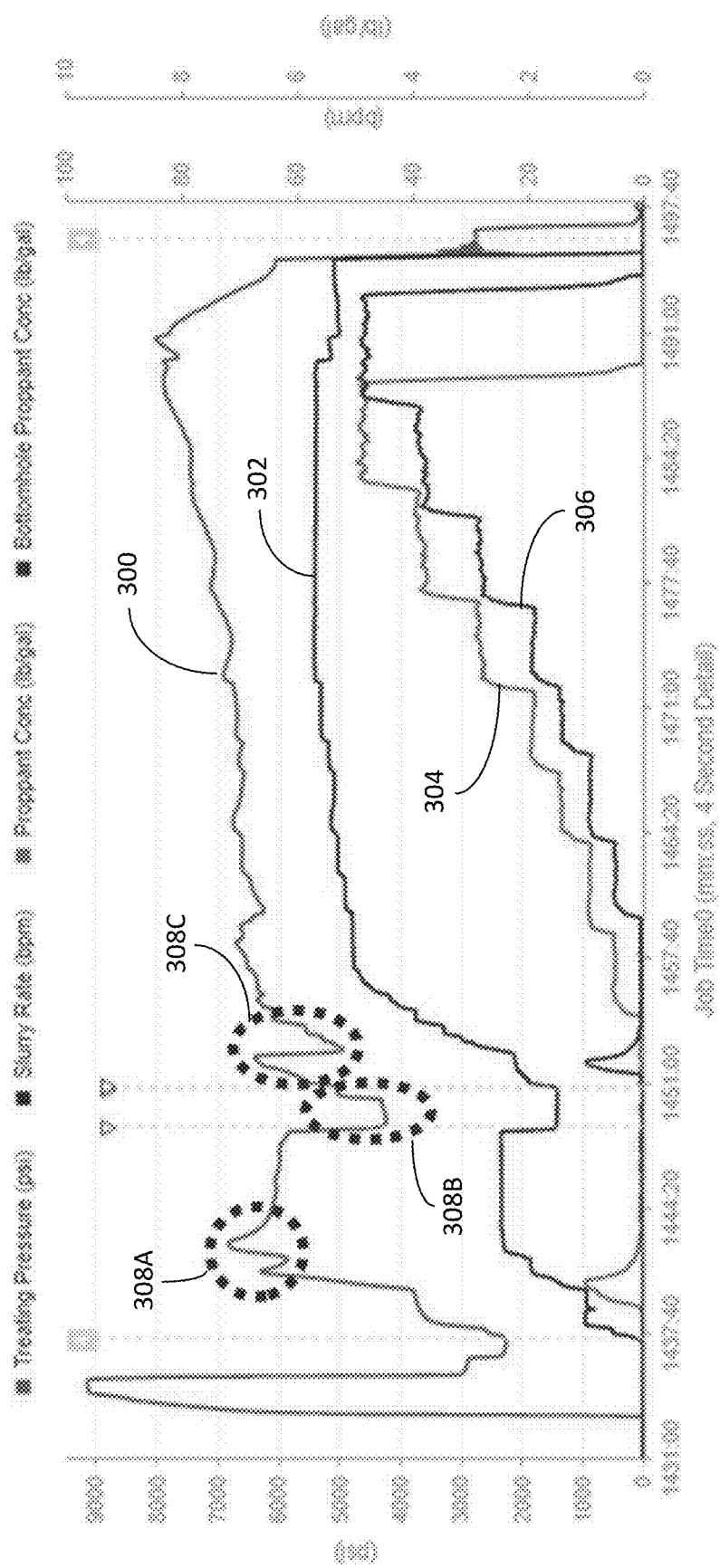
FIG. 3 is a diagram of time series well treatment data plots of treating pressure, slurry rate, proppant concentration and bottomhole proppant concentration for a well stage being treated, with areas where breakdown pressure may be identified and misidentified.

Referring to FIG. 2, the method involves accessing treatment data (200). FIG. 3 is a diagram depicting various curves associated with hydraulic fracturing a stage of a well in an unconventional reservoir. In the present embodiment and referring to FIG. 3, the illustrated channels are treating pressure (recorded in pounds per square inch (PSI)) 300, slurry rate (recorded in barrels per minute (BPM)) 302, proppant concentration (recorded in lb/gal) 304 and bottomhole proppant concentration (recorded in lb/gal) 306. This data may be obtained from various sensors and gauges associated with the hydraulic fracturing system 100 or the well head 102 or otherwise. The horizontal axis is "job time" recorded as time scale in minute (mm):second (ss) scale. Breakdown pressure is typically associated with a pressure hump 308A (portion of treating pressure curve with dashed circle) at the beginning of hydraulically fracturing a stage while the slurry rate is constant. In unconventional reservoirs, however, due to their complexity, similar pressure humps (portions of treating pressure curve denoted by dashed circles 108B and 108C) may occur several times complicating the task of automated identification of breakdown. Further, the breakdown pressure behavior in different wells and in different formations may vary greatly. Moreover, breakdown pressure behavior may be highly affected by the slurry rate, such that if one service provider is pumping the fracture treatment differently than another, the pressure behavior will be different. For any of these reasons, among others, relying on the manual identification of when breakdown occurs and computing breakdown pressure from the details often a time consuming process that is prone to inaccuracies due to in consistent selection methods and/or interpretation of the data.

Figure 4:
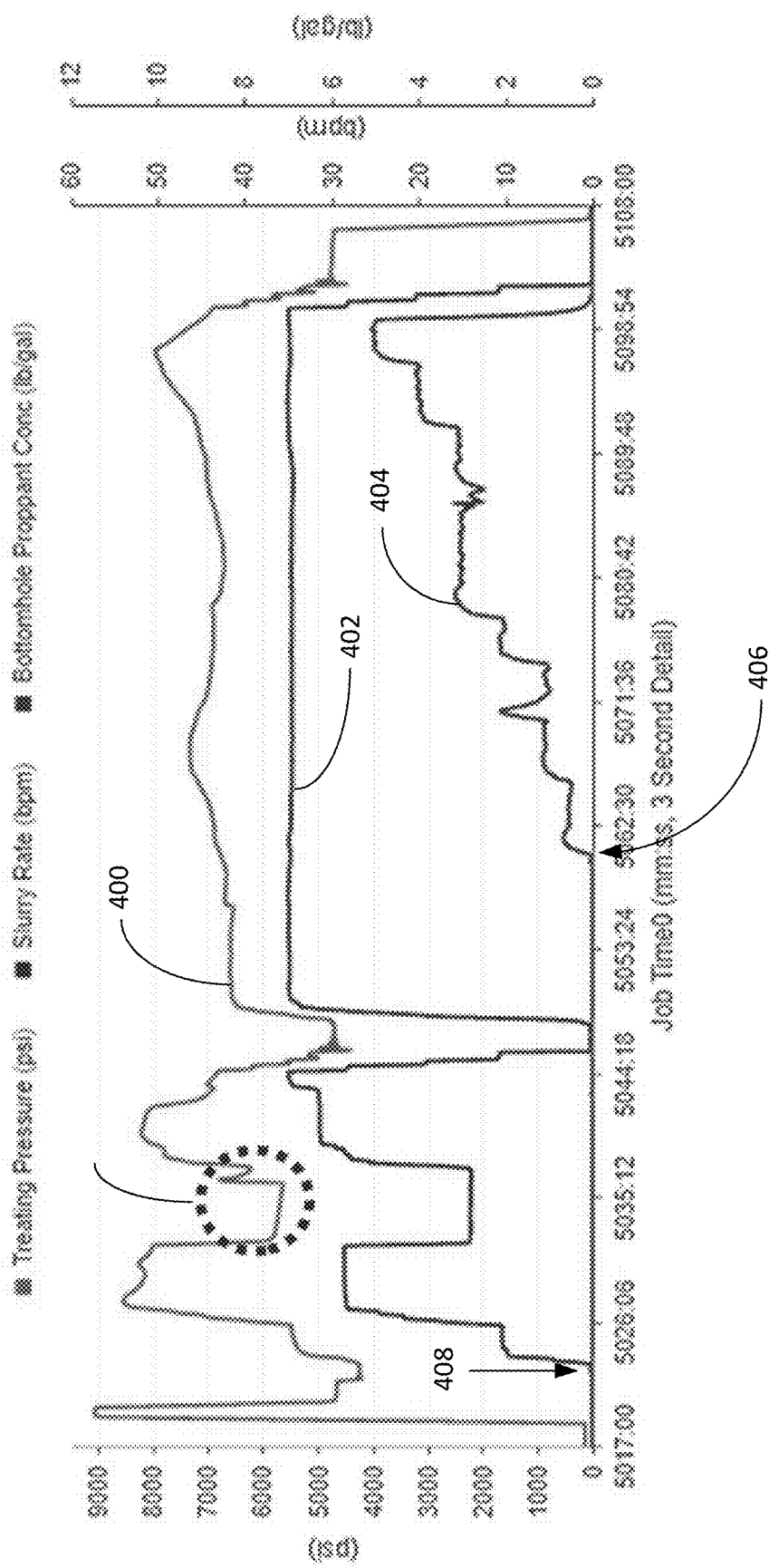
FIG. 4 is a diagram of time series well treatment data plat of treating pressure, slurry rate and bottomhole proppant concentration for a well stage being treated, with an area, according to embodiments of the present disclosure, that correctly correlates with breakdown pressure.

FIG. 4 illustrates high-frequency treatment data for a stage of a horizontal well undergoing hydraulic fracturing. The data includes data channels for treating pressure (TP) 400, slurry rate (SR) 402, and bottomhole proppant concentration (BHPC) 404. Referring to FIG. 2, the method may involve generating a higher order channel or channels from the treatment data channels. In the present embodiment, from the treatment data, the system may derive higher order channels for rate of change of treating pressure (TP') and the rate of change of slurry rate (SR'). These higher order channels are added to the data frame including the treatment data, organized and aligned by time. In some instances, the rate of change channels are computed from the first derivative of the respective values of each of the TP and SR channels.

Figure 5:
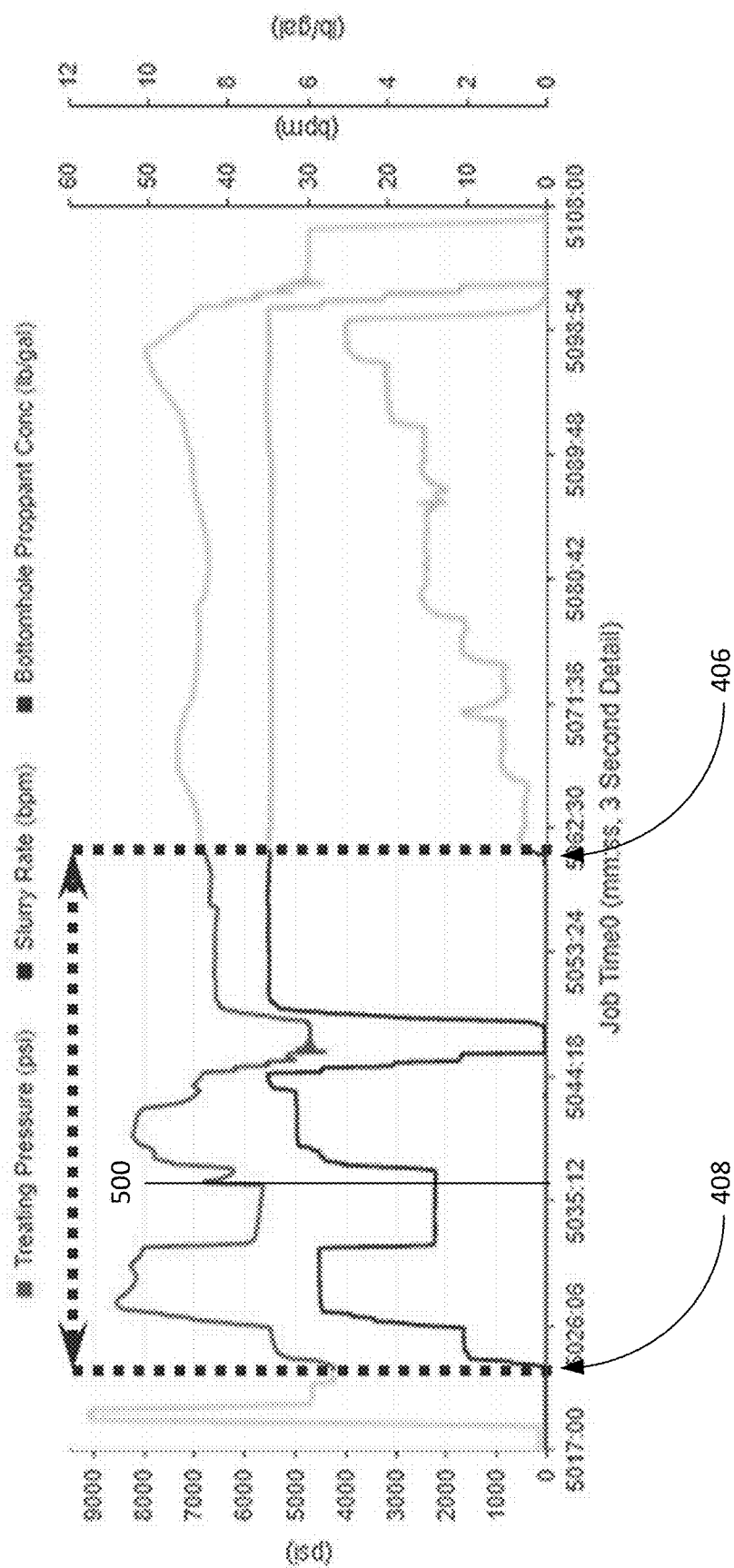
FIG. 5 is a diagram of the time series well treatment data of FIG. 4, with a reduced time window generated according to embodiments of the present disclosure, to reduce the areas of the treatment data to process where breakdown pressure may occur.

Referring to FIG. 2, the method may involve filtering the data (operation 206) to reduce processing complexity and/or to reduce the likelihood of generating false positives. In the case of identifying breakdown pressure, in one example, the system may generate a subset of the dataset including the data points from some start time, e.g., time 0 or otherwise the beginning of the data set, until the BHPC is at some value indicative of a non-zero concentration (e.g., 0.22 lb/gal). In the case of identifying breakdown pressure, the breakdown pressure occurs while the BHPC is zero. Thus, the data after the BHPC rises above zero 406 can be filtered out (e.g., removed from the subset). FIG. 5 includes the same data channels as illustrated in FIG. 4, with a first vertical line at the point 406, and the data to the right (the values in time after the point 206) are removed to form a subset. The value of 0.22 lb/gal is one possible value but other can be chosen as well. However, if a channel for BHPC does not exist in the dataset, then the first 30 minutes of data for that dataset may be used or some other amount of data relevant to the well data being processed and such that the data will encompass the time when breakdown pressure occurs.

The data may be further reduced and filtered, to further isolate the data most likely to contain the feature of interest (e.g., to further isolate the data during the time when breakdown is likely to occur). In one example, the subset of data is further filtered to retain the data where the slurry rate is greater than 0 bpm and less than 35 bpm. This range is considered to encompass the area where breakdown may occur, and the breakdown pressure captured in the treating pressure data. In FIG. 5, a second vertical line is shown where the slurry rate is begins to rise 408 and is greater than 0. The SR data to the right of the second vertical line is less than 35 BPM. The data preceding the second vertical line is removed from the subset. Hence, after the two data reduction steps, the subset contains the data between the first and second vertical lines (the data associated with the times between the first vertical line and the second vertical line). It should be noted that the vertical line is merely a way to illustrate where filtering of the data occurs.

Referring again to FIG. 2, from the filtered data set, the system identifies the feature of interest (operation 208). In more detail and relative to the present embodiment, from within the subset, the system identifies the breakdown pressure by finding the highest (peak) TP value where the slurry rate is constant. In one example, the system generates the higher order TP' and SR' values for the subset. However, the higher order channels may be computed for the original dataset and the higher order channels retained only for the subset based on the process discussed above. To find the highest TP where SR is constant, the system uses the TP' and SR' values. In one example, the system first identifies the largest magnitude TP' values (e.g., the peak TP' values) and assesses those peak values in order from highest to lowest, and each is compared to the corresponding SR' value (e.g., the SR' value at the same time). In one example, the treating pressure at the highest TP' value where the SR' value is 0 or substantially zero (e.g., within a threshold of zero) is set as the breakdown pressure.

Figure 6:
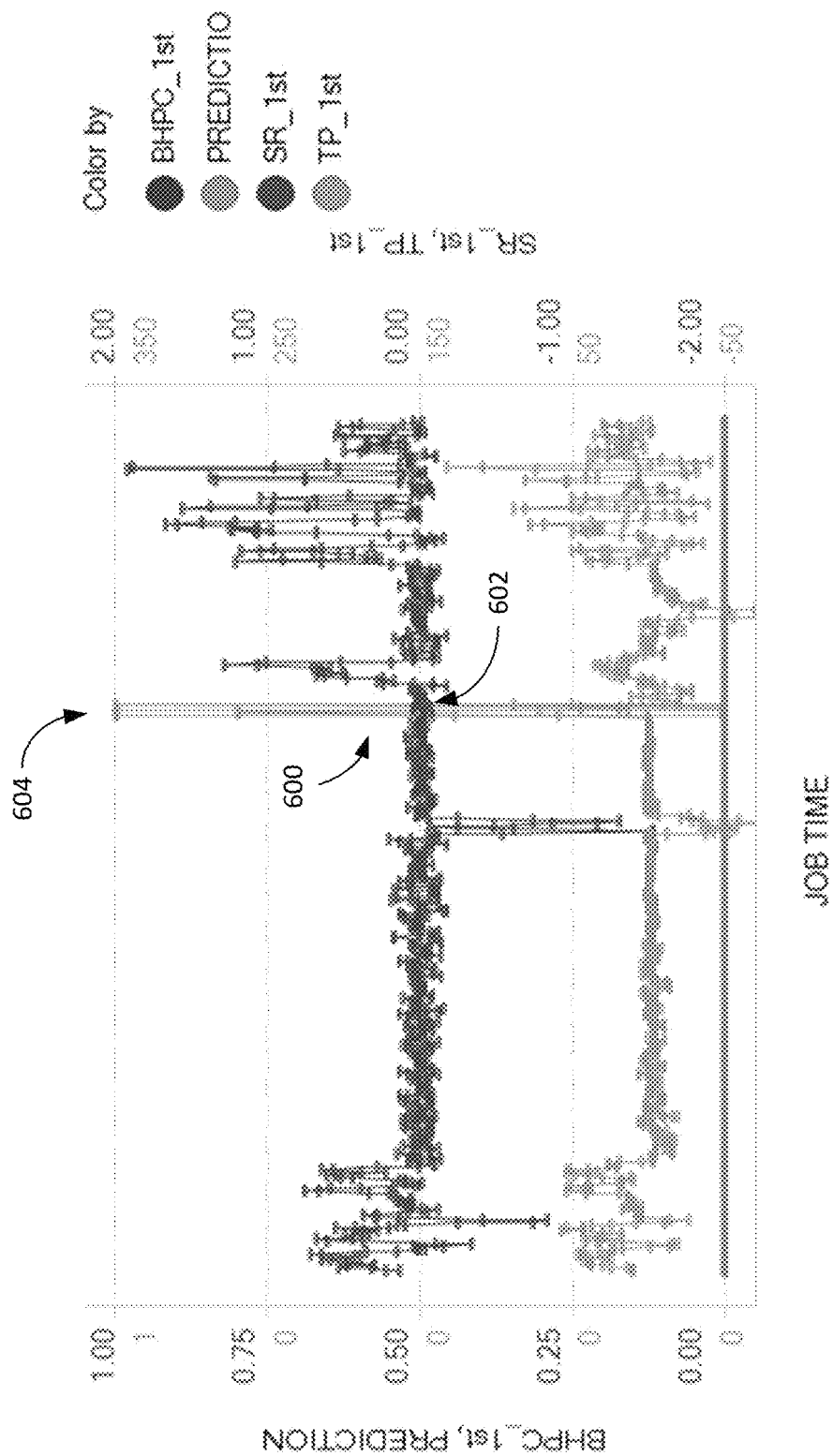
FIG. 6 is a diagram depicting predicted breakdown pressure locations at peak values of the first derivate of the treating pressure and constant values of the slurry rate, according to one embodiment of the present disclosure.

FIG. 6 is a graph of the TP' and SR' values for the subset of data. It can be seen that there are several peaks 600 in the TP' values clustered near the same time where the SR' values 602 are zero or nearly zero. In FIG. 6, in the same area where the TP peaks are shown, there are predicted breakdown pressure locations 604. This behavior can be expected as the treating pressure spike associated with breakdown pressure may be noisy and may occur over a period of time and thus be captured at different points in time. Thus, in one specific example and to select one value as the breakdown pressure, the system assesses a first set (e.g., 5) of the highest TP' values, beginning with the highest value, to determine if any are associated with a constant slurry rate (e.g., at SR' equal or nearly equal to zero). The system picks the highest TP' value where SR' is constant. If the first set does not yield a breakdown pressure, the system assess a following second set (e.g., 35) and then, if not breakdown pressure is determined, another set (e.g. 50) until the value is found or the system otherwise halts.

To determine if the slurry rate is constant at any particular TP' value, the system evaluates SR' values at the time of the TP' value as well as SR' values before and after the TP' value to determine if the slurry rate is indeed constant or noise in the system simply suggesting the slurry rate was constant. Stated differently, a discrete SR' value may be zero or within a threshold of zero simply due to noise, and should that SR' value happen to occur at a peak TP' value, it may throw a false positive. To reduce the chance of detecting a false positive, in one example, as referenced above, the original time series data (TP, SR, BHPC) and the derived channels (e.g., SR' and TP') are indexed (e.g., aligned) on the same scale, e.g., time. The system them uses the indexes for comparison purposes across data channels. In one specific example, for a TP' value at index (i), the slurry rate is considered constant when the following conditions are met:

0.10<=SR'i<=0.10 and SRi>0 and
0.25<=SR'i−2<=0.25 and SRi−2>0 and
0.25<=SR'i−1<=0.25 and SRi−1>0 and
0.25<=SR'i+1<=0.25 and SRi+1>0 and
0.25<=SR'i+2<=0.25 and SRi+2>0

Generally speaking, the slurry rate is considered constant when the SR' value at the same index as the TP' index has a rate of change between −0.1 and 0.1, and the raw slurry rate is greater than zero. The system then considers the SR' values before and after the TP'(i) value being assessed; in this example, at two indexes (i−2 and i−1) before and two indexes (i+2 and i+1) after. If the SR' values show a rate of change within + or −0.25, while the slurry rate is greater than zero, the system considers the slurry rate to be constant at the assessed TP' value. The system may assess more or less SR' values and/or apply other thresholds in different possible implementations.

Referring again to FIG. 6, for each peak 600, the SR' values 602 indicate a constant slurry rate. Thus, initially, within the first set of peak TP' values, there are several correlated to a SR' near zero. The system selects the highest TP' value and marks the dataset for the treating pressure as the breakdown pressure, and also generates a flag 500 for display in a graphical user interface depicting the data the corresponding treating pressure as the breakdown pressure.

However, to further refine the technique, upon finding one or more matches within one of the sets, the system may add a larger time window around the peak value, before and or after the matching index value or values (e.g., 18 seconds) and generate a new list of TP' values to asses. The addition of values before and after the highest initial TP' value or set of TP' values helps to identify the highest TP value where breakdown occurs and that may not otherwise be captured. From the new list, the maximum treating pressure value where the change in slurry rate is substantially zero is returned as the breakdown pressure. In one possible example, a flag or other marker is set in the original data set such that display of the same delineates the breakdown pressure.

Diverter

Diverter is typically a chemical agent or a mechanical device used to temporarily bridge or otherwise plug the areas of the well taking fluid and enable the redirection of the fluid to under-stimulated intervals. Stated differently, during hydraulic fracturing, diverters plug perforations taking fluid to redirect the fluid to other perforations with the objective of improving fractures emanating into the formation at those previous perforations. For advanced completion designs (complex fracture networks), the goal is not to just increase the stage count but to increase the number of initiation points (perforation clusters) that are effectively stimulated increasing the contacted fracture surface area. Completion designs that utilize diverters have resulted in a dramatic increase in the number of fracture initiation points. Once the area (e.g., a stage) is uniformly stimulated, the diverters dissolve over time, when in contact with water or oil, or with temperature changes.

Figure 7:
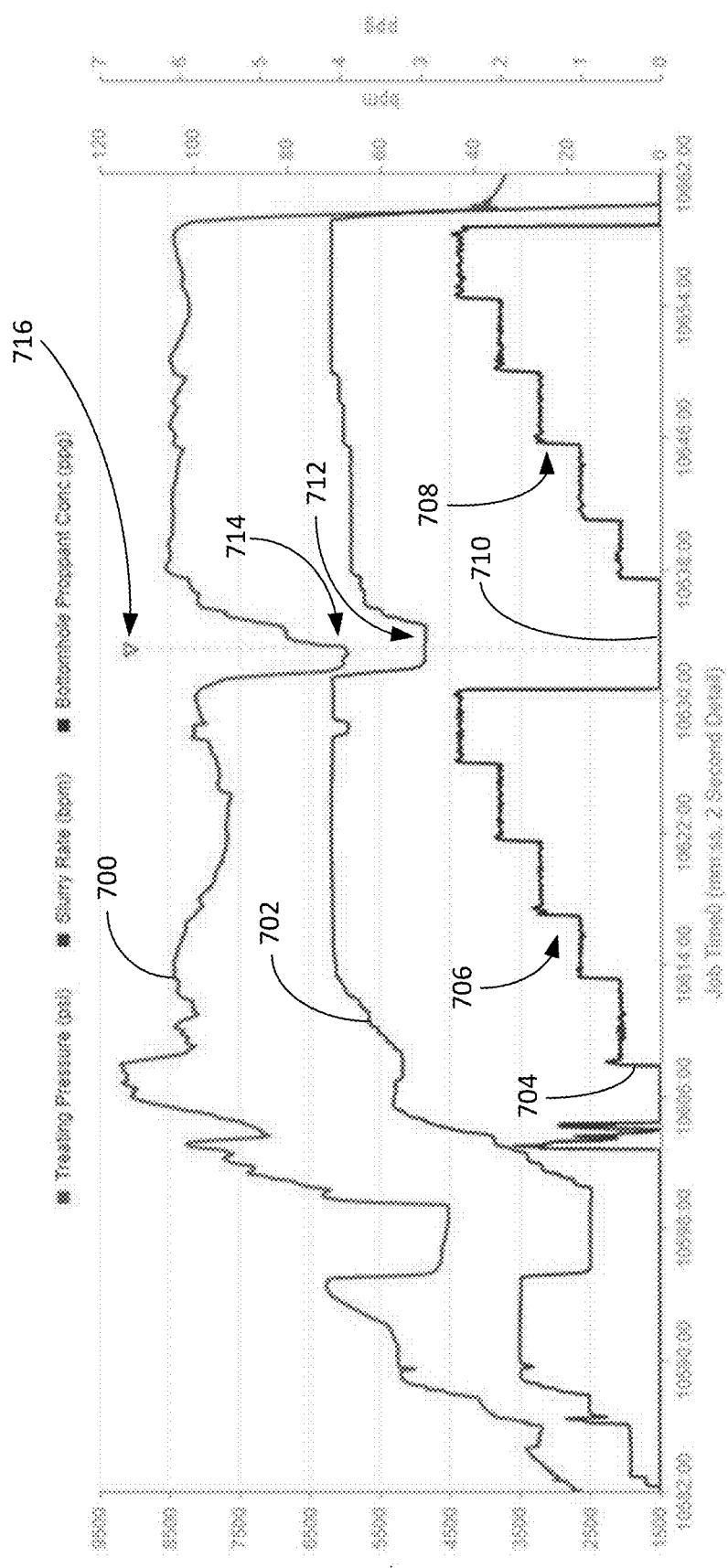
FIG. 7 is a diagram of time-series data of treating pressure, slurry rate and bottomhole proppant concentration illustrating a location of when diverter has begun acting in a stage.

A sudden increase in treating pressure when the diverter agent reaches the perforations is an indicator of its effectiveness. In effect, when a diverter plugs a perforation, the fluid flowing into the previously open perforation is blocked and pressure starts to build until the fluid meets the breakdown pressure at one more additional initiation points and starts again to flow into the newly formed perforation. Returning to FIG. 2, the system first gather data relevant to finding the feature of interest (operation 200). FIG. 7 illustrates the general conditions associated with diverter having caused the initiation of a new fracture. For diverter, FIG. 7 includes data channels for TP 700, SR 702 and BHPC 704 (measured in ppg). FIG. 7 illustrates two sets of proppant ramps 706, 708—the step behavior in the BHPC pressure values between zero and some value, and then back to zero. In between the first set and the second set of proppant ramps, and generally between proppant ramps, when bottomhole proppant concentration (BHPC) is zero 710 (where zero may include values within some threshold of zero), the slurry rate during typical completion operations should be fairly constant 712 and there should be a significant increase in treating pressure 714, illustrated by the abrupt upward slope of the treating pressure, when the diverter has reached the perforations taking fluid and has begun diverting fluid to new perforations. Being able to locate the specific time when the diverter reaches the perforations, and separately quantify the pressure change associated with initiation of one or more new fractures from the new perforations, allows the completions engineer to estimate if the diverter was successful or not successful and for the hydraulic fracturing system to adjusted to any number of possible parameters in the following stages or in a subsequent well being completed in the same formation.

One aspect of the present technology involves automating the identification of when diverter has reached perforations in a stage and begun to have an effect—referred to as a diverter flag 716. Similar to the identification of breakdown pressure, the diverter flag automation involves using a heuristic approach in lieu of machine learning techniques. First, the system obtains high-frequency treatment data for at least one stage of a well undergoing completion but preferably for several stages (operation 200). The data file may include treating pressure (TP), slurry rate (SR), and bottomhole proppant concentration (BHPC).

In one example, the system focuses on the rate of change of both channels to identify where the rate of change of TP and SR are greatest, and the slurry rate is constant. The system generates new, higher order, channels by obtaining the rate of change of treating pressure (TP') and the rate of change of slurry rate (SR') (operation 202). There may be noise in the signals and the system thus may filter the noise. In one specific implementation, the system applies a 45 second, or some other time window, simple moving average (SMA) to the data (operation 206).

Unlike for breakdown pressure, the system here combines the rate of change channels (operation 204). Generally speaking, in the time when diverter is taking effect, the slurry rate of change should be delayed relative to the treating pressure rate of change. Combining the channels may allow the system to better discern when only the treating pressure is changing and slurry rate is constant, indicative of when diverter is taking effect, as compared to when both the treating pressure and the slurry rate are changing, which occurs after diverter takes effect. However, treating pressure and slurry rate have different measurement values—psi and bpm, respectively. To combine the rate of change values, each is normalized or otherwise scaled to a magnitude/valueless parameter (operation 204). In one example, the system combines the scaled channels, and analyzes the combined channels to identify the highest peak (operation 208). The system may set the diverter flag at the time when the slurry rate is also substantially constant. As noted herein, SR may be noisy and hence some threshold for rate of change, both plus or minus, may be acceptable and considered constant.

Figure 8:
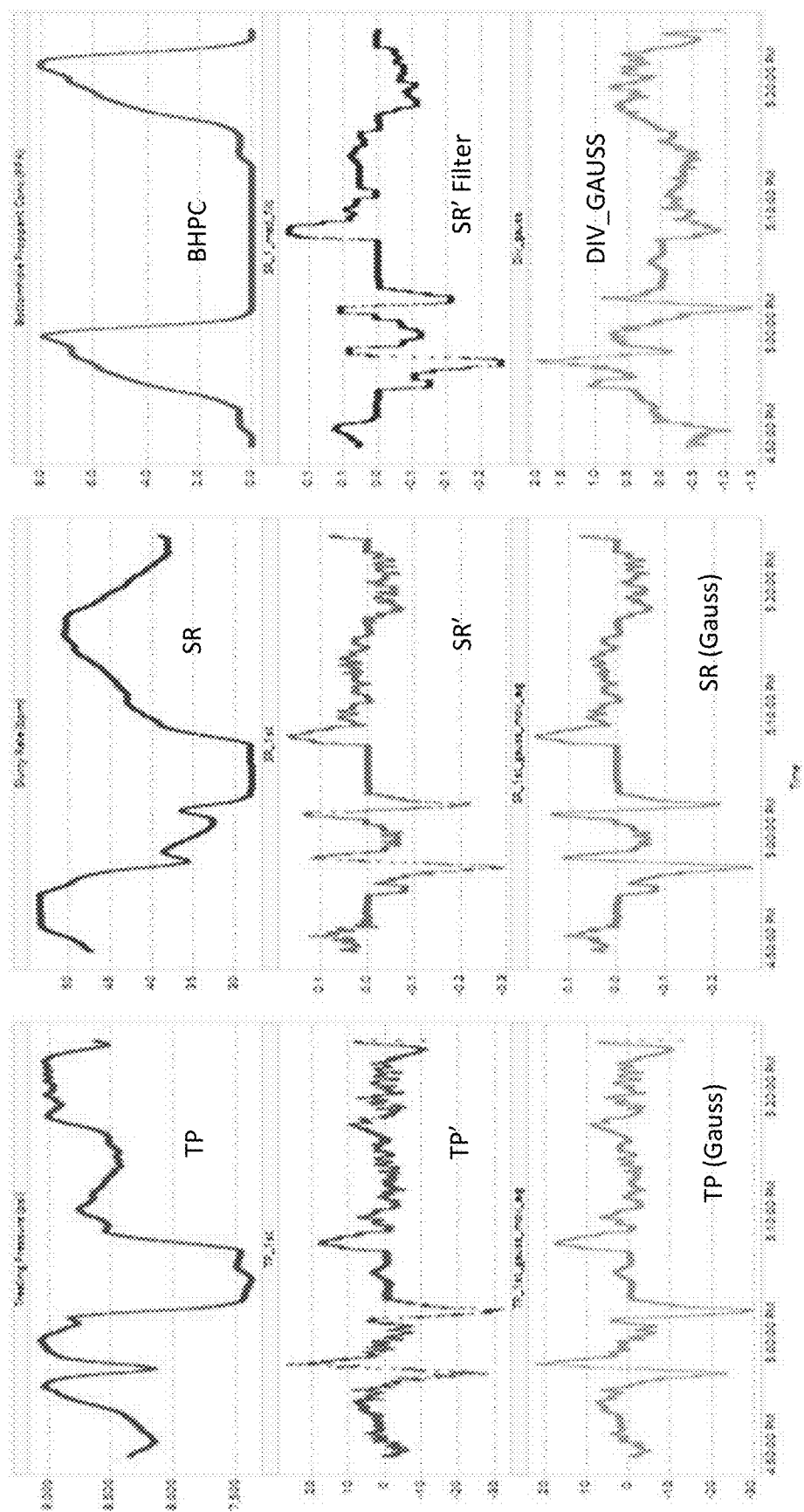
FIG. 8 is a diagram of various channels, raw and derived, that may be obtained, generated, and/or combined to identify a diverter location and the pressure response from such a diverter, according to one embodiment of the present disclosure.

FIG. 8 is an example of the various additional channels that may be added to the data frame. In more detail and in another embodiment, the system adds the new data channels, TP' and SR', to the data frame. In one specific example, the TP' and SR' channels may be further processed to generate additional channels. Namely, as illustrated in FIG. 8, from the TP' and SR' channels, the system may apply a Gaussian moving average to the TP' channel to generate a new TP' channel (TP_Gausss) and to the SR' channel to generate a new SR' channel (SR_Gauss) with a bandwidth for the Gaussian moving average computation equal to 39 and sigma equal to 3. In the examples illustrated in FIG. 2, another new, higher order channel, is for the median average of the SR' channel (SR' Filter) with a window of 61 seconds, which will have a step-like behavior and will help remove noise when identifying an area with constant rate. The system further generates another derived channel as the difference between the scaled TP' and the scaled SR' Gauss channel (DIV_GAUSS). The purpose of the DIV_GAUSS channel is to identify the area of the plot where the pressure and rate have opposing behaviors (e.g., pressure is increasing while rate is constant). During operations where diverter is not being deployed, the pressure behavior is affected mainly by slurry rate changes; thus, if the pressure changes while the rate is constant something else is causing pressure changes (diverter blocking area of flow, fluid type changes, formation or completion effects, etc.).

Figure 9:
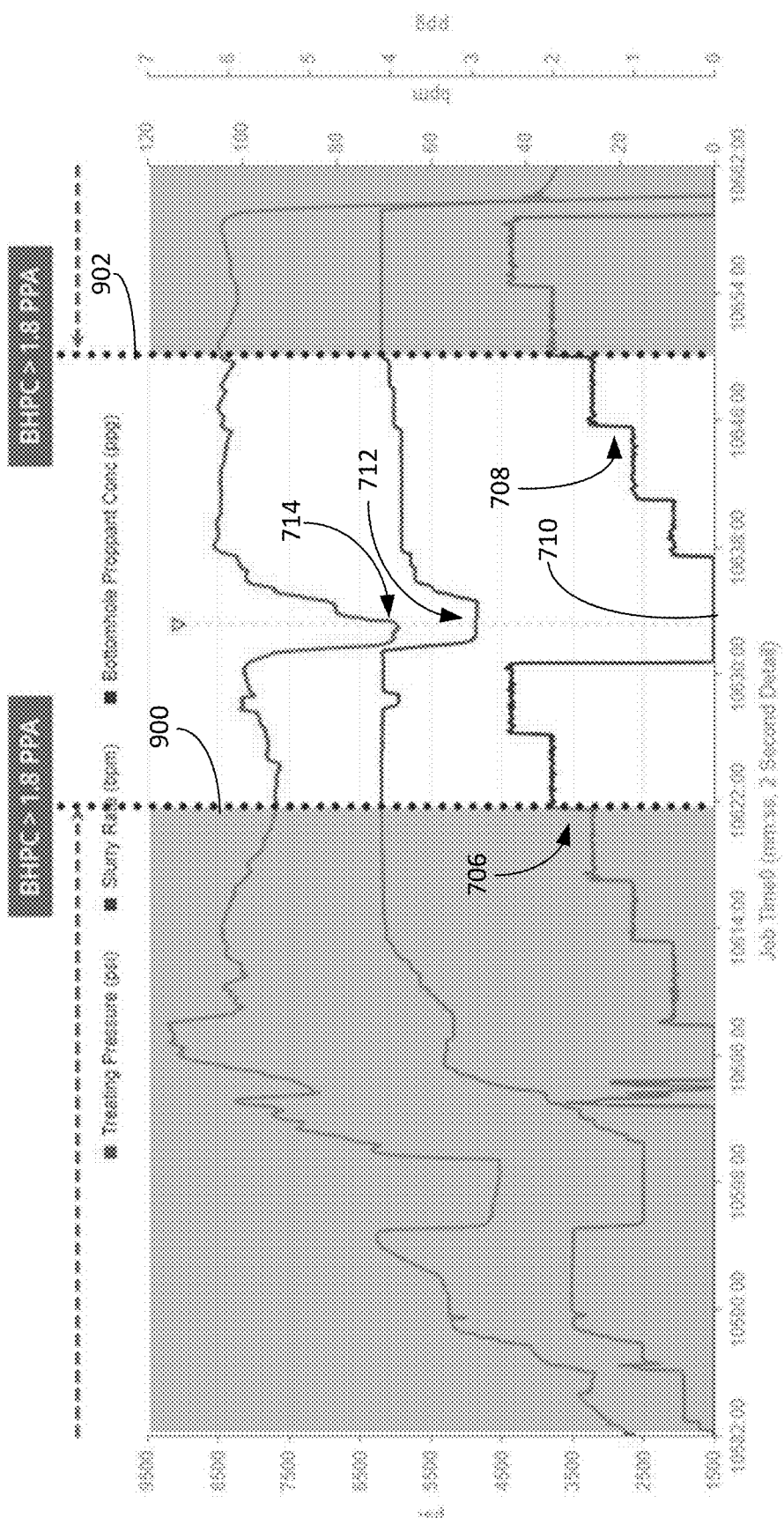
FIG. 9 is a diagram of the channels illustrated in FIG. 8, with the dataset reduced to isolate the time when diverter is most likely to cause an effect, eliminate sources of noise and/or enhance the processing efficiency and memory resources, according to one embodiment of the present disclosure.

The system focuses on the portions of the data channels were BHPC is substantially zero 712 and between proppant ramps 710. One goal of the system is thus to isolate the parts of the treating plot in between proppant ramps (where proppant is increasing in steps) and where the BHPC is effectively zero. To achieve these ends, in one example, the system generates a subset data frame removing the data points from the start of the data file, or some other start indication such as a start time flag until the BHPC is greater than 1.8 PPA. This point is shown in FIG. 9 at vertical line 900 and occurs in the first set of proppant ramps 706. Some other BHPC value is also possible that signals the start of an increase in BHPC, and the system cuts off the data at that point. If there is no value greater than 1.8 PPA (or another value), then the system uses a computation of the difference between the maximum value of bottomhole proppant concentration and 0.1 PPA. Then, the system follows the same procedure starting from the end of the file and moving to the left towards the start of the stage. As shown in FIG. 9, the process removes the data from the end of the file until the BHPC is 1.8 PPA or greater denoted by the second vertical line 902, which occurs during the second set of proppant ramps 708. As can be seen, processing retains the data between the proppant ramps (between the vertical lines) including where BHPC is zero for some period 710, the rate of change of slurry rate is zero for some period 712, and there is a rapid increase 714 in treating pressure where the slurry rate is constant and BHPC is zero.

Figure 10:
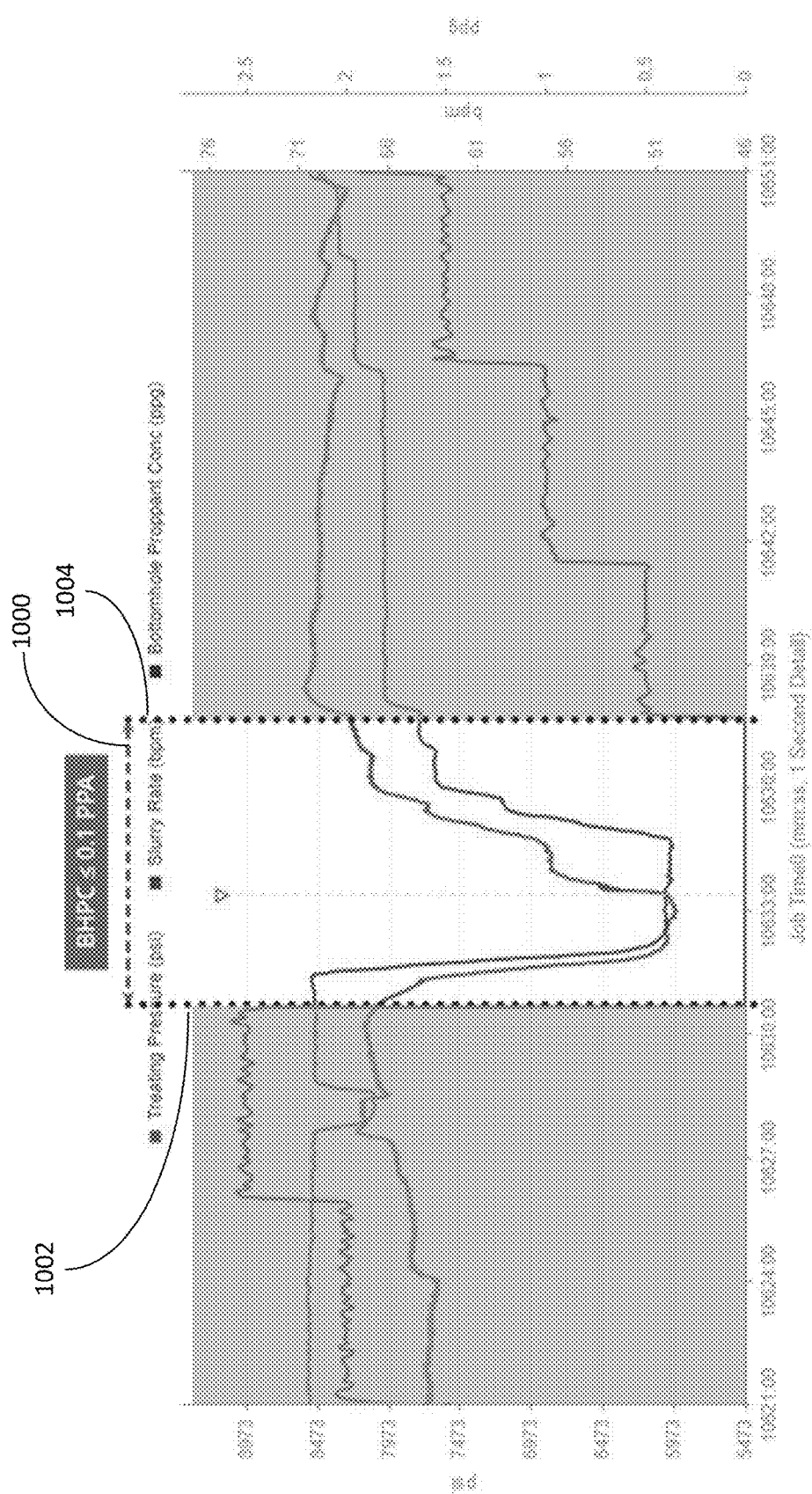
FIG. 10 is a diagram of the channels illustrated in FIG. 9, with the dataset further reduced to isolate the time when diverter is most likely to cause an effect, eliminate sources of noise and/or enhance the processing efficiency and memory resources, according to one embodiment of the present disclosure.
Figure 11:
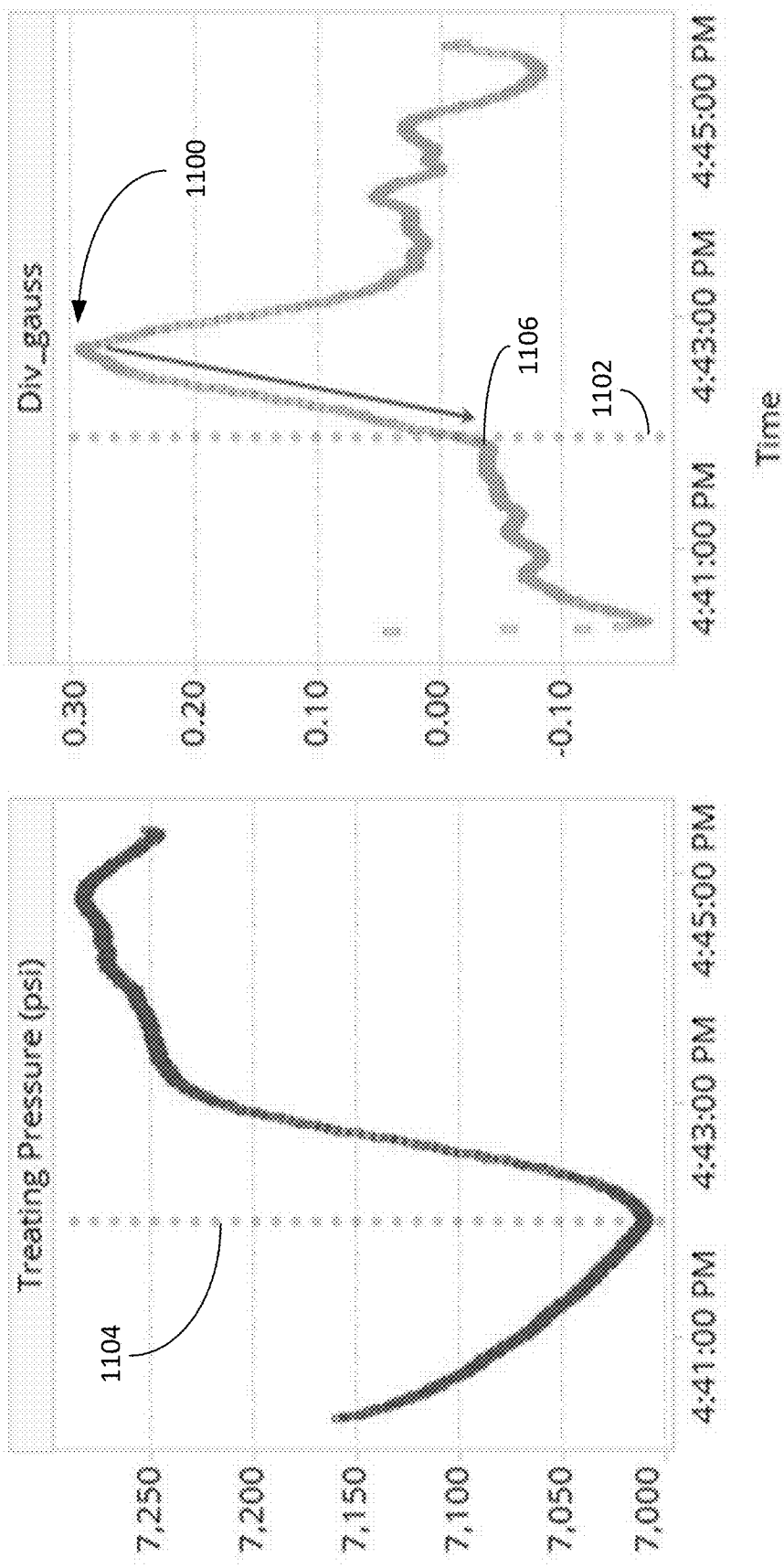
FIG. 11 is a diagram of a treating pressure channel and a higher order channel, filtered and reduced, and processed to identify a change in pressure associated with diverter and computing the pressure change caused by the diverter and used in determining diverter effectiveness, from which subsequent operations, completion, fracturing or otherwise, may be altered, according to one embodiment of the present disclosure.

After the system generates the reduced data frame, the system processes the remaining data to further isolate only the data where BHPC is effectively zero. Referring to FIG. 10, in one example, the system generates a second subset data frame 1000 retaining only the portions of the data channels where the values of BHPC are less or equal than 0.1 PPA denoted by the two vertical lines 1002 and 1004. The BHPC of 0.1 recognizes that some noise may be present in the signal and 0.1 is considered effectively zero. Other filtering technique or thresholds are possible. To further reduce the data to the areas where slurry rate is constant, a filter may applied to the slurry rate derivative median average (SR_1_med_filt), removing values greater or equal to −0.035 and less or equal to 0.01. Another filter may be applied to the Div_gauss channel to greater or equal to −0.03 and less or equal to the maximum value. FIG. 11 shows one example of a final subset data frame corresponding to one diverter drop in a stage after all the filters are applied. Returning to the reduced data set illustrated in FIG. 10 and also referencing FIG. 11, after processing the data to reduce the data to the time, during a completion, when diverter would be used and detectible, the first step to identifying the diverter flag location is for the system to identify the maximum value of the higher order channel of the difference between the scaled treating pressure derivative and the scaled slurry rate derivative Gaussian moving average–the maximum value 1100 from the DIV_GAUSS channel. From the peak value, the system then assess the data preceding the maximum value (e.g., the system assesses the data moving towards the left, and identifies the first value greater than or equal to −0.03 and less than or equal to 0.15 as shown by the dashed vertical line 1102 in FIG. 11). Alternatively, the system may identify the last value before a jump in the job time greater than 1 second. Finally, the system identifies the time (e.g., job time) of the inflection point 1106 of the DIV_GAUSS channel to place the diverter flag 1104 and obtains the corresponding treating pressure value at the flag location.

Figure 12:
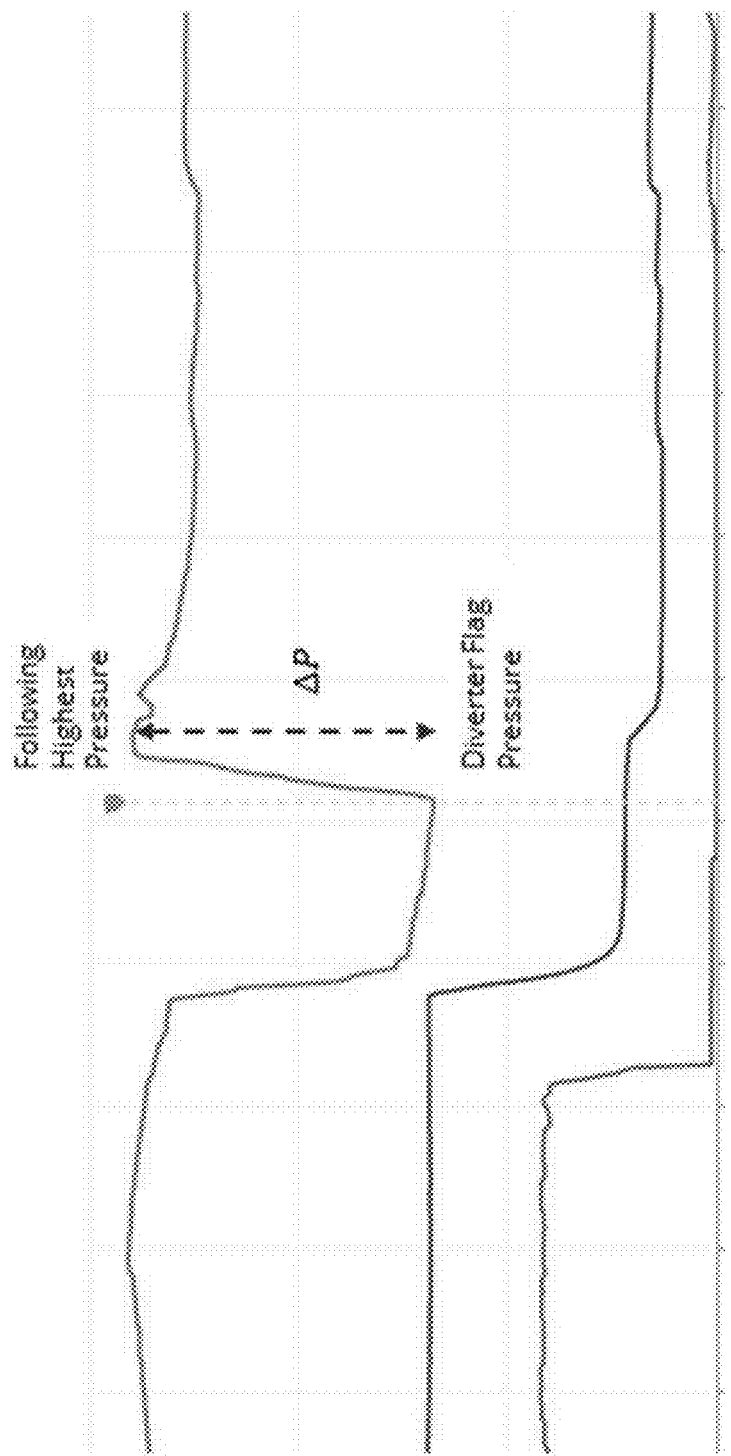
FIG. 12 is a diagram showing a diverter flag and a pressure change caused by diverter placement, according to one embodiment of the present disclosure.

Referring to FIG. 11 and FIG. 12, in one embodiment, the system further assesses whether the diverter was successful. In one example, once the diverter flag is located (and the treating pressure obtained at the time of the diverter), the system may further proceed to identify the amount of increase in treating pressure caused by the diverter and determine whether the pressure exceeds a threshold suggestive of a successful or unsuccessful diverter operation. The system, generally speaking, obtains the highest treating pressure following the diverter, with the highest treating pressure at the point where the treating pressure has stopped changing while the slurry rate remains constant. For this, the system uses a similar process described above; namely, the system moves from the maximum Div_gauss value 1100 towards the right and finds the value of Div_gauss close to zero (this is where the treating pressure has stopped changing and the slurry rate is still constant) or there is a jump of index values greater than 1 second. The system, using the time when the DIV_Gauss value is at zero, obtains the treating pressure. In one example, the system takes the difference in values (between the pressure at the diverter flag and the pressure when DIV_Gauss is zero and slurry rate is constant) and sets the difference as the amount of increase caused by the diverter.

In another example, the system may further execute a refining procedure to further assess and assign the minimum (diverter pressure) and maximum pressure values. First, with respect to the diverter pressure, the refining functions takes 30 seconds before the time associated with the diverter flag and 30 seconds after (or some other threshold before and after the diverter flag), and generate a dataframe. In the new data frame, the system finds the minimum treating pressure value with its corresponding job time. In the case of the maximum diverter, the system assesses the 15 seconds before and after the time for the maximum diverter, and creates another dataframe. The system then takes the values where BHPC and SR_1_med_filt are equal to zero (or substantially zero recognizing noise) and finds the maximum treating pressure value with its corresponding job time. Next, a new data frame is created between the diverter job time and the maximum diverter job time, and the minimum treating pressure value is found within the new data frame, which will correspond to the final diverter value. A second data frame is created from the final diverter job time to the time of the maximum diverter, the maximum treating pressure value is found with the second new data frame and selected as the maximum diverter with its corresponding job time. Finally, the system calculate the pressure difference between these two values. If the treating pressure change caused by the diverter is lower than 50 psi, the system indicates that the diverter was unsuccessful, and no diverter flag is placed and other indicia may be set in the GUI. If the pressure change is greater than 50 psi, the system places the flag in the treating pressure GUI and may further display the change in treating pressure. Other pressure differentials are possible.

Offset Pressure

As discussed thus far, aspects of the present disclosure involve a method and system for generating data channels from time-series data in addition to those channels already native to the time-series data. For example, higher order channels, such as channels based on a derivative, processed through a particular mapping function, or the like, may be generated from an initial native time-series data channel or channels. In the various embodiments described herein, the derived channels may be used to provide data visualizations, such as through a graphical user interface (GUI), or for use by the system or other systems in downstream processes, such as training models or the like, for further processing and analysis, and for adjusting subsequent drilling, completion and/or hydraulic fracturing operations.

Figure 13:
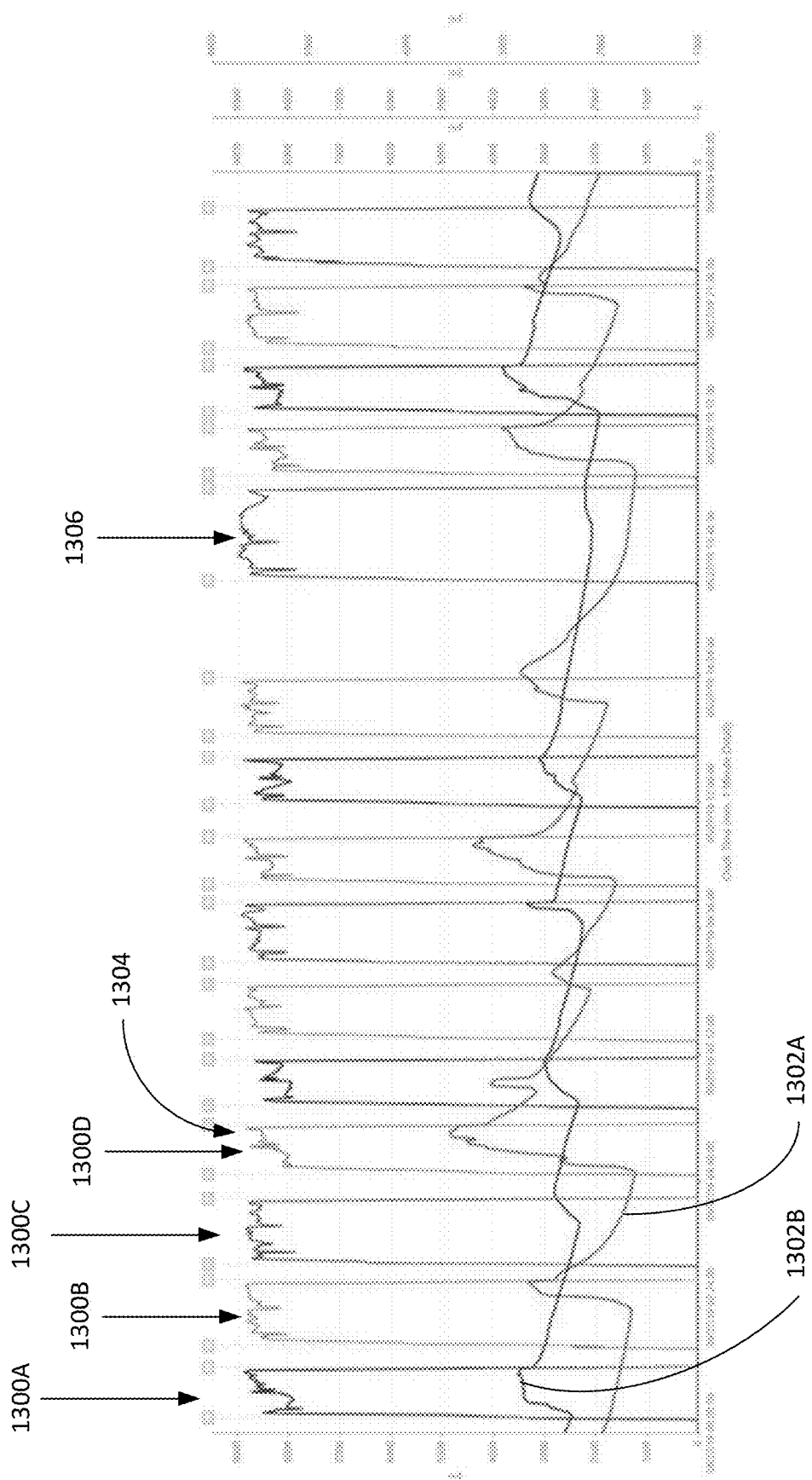
FIG. 13 is a diagram illustrating treating pressure in four different active wells (wells being hydraulically fractured) in different stages, and pressure response in two legacy wells (wells producing after fracturing) in the same formation, where some pressure responses in the legacy wells is from fracture interaction from the active wells.

In one example, a higher order channel can be generated by calculating a difference in index values and filtering out those that fall below some value (e.g., time) threshold. The channel creation and filtering can be used as part of a process for recognizing offset pressure response in a well based on sensor data. Fracture-driven interactions (FDI) involve the interaction of fractures from a well being hydraulically fractured with a nearby completed well, which is often already producing. As new wells are drilled and completed in a pad that has existing wells or otherwise as new wells are drilled in a formation near existing wells, the existing wells may sometimes receive a pressure interference or communication from fractures created in the new wells. In essence, as a fracture grows outward from a stage of a well being completed, a pressure response can sometimes be depicted in a nearby well as the fracture approaches or overlaps the existing well or fractures from that existing well. FIG. 13 is an example of pressure responses in a neighboring well caused by fracture growth from a well being completed. In more detail, FIG. 13 shows pressure channels throughout a hydraulic fracturing process for four active wells being completed 1300A, 1300B, 1300C and 1300D that are monitored alongside pressure channels 1302A and 1302B for two offset wells. The pressure channels for the active wells can be treating pressure whereas the pressure channels from the offset well can be from pressure sensors in the well, along the casing, at the surface or otherwise. Generally speaking, an increase in pressure at the offset well is indicative of a fracture, emanating from the active well, interacting with the offset well as shown by the pressure increases correlated with the various times when a well is being completed. For example, when the well associated with the pressure response curve 1300D is being completed at time 1304, it can be seen that the offset well for 1302A increases whereas 1302B does not, hence there is a FDI with 1302A. At 1306, neither offset well experiences a change.

Figure 14:
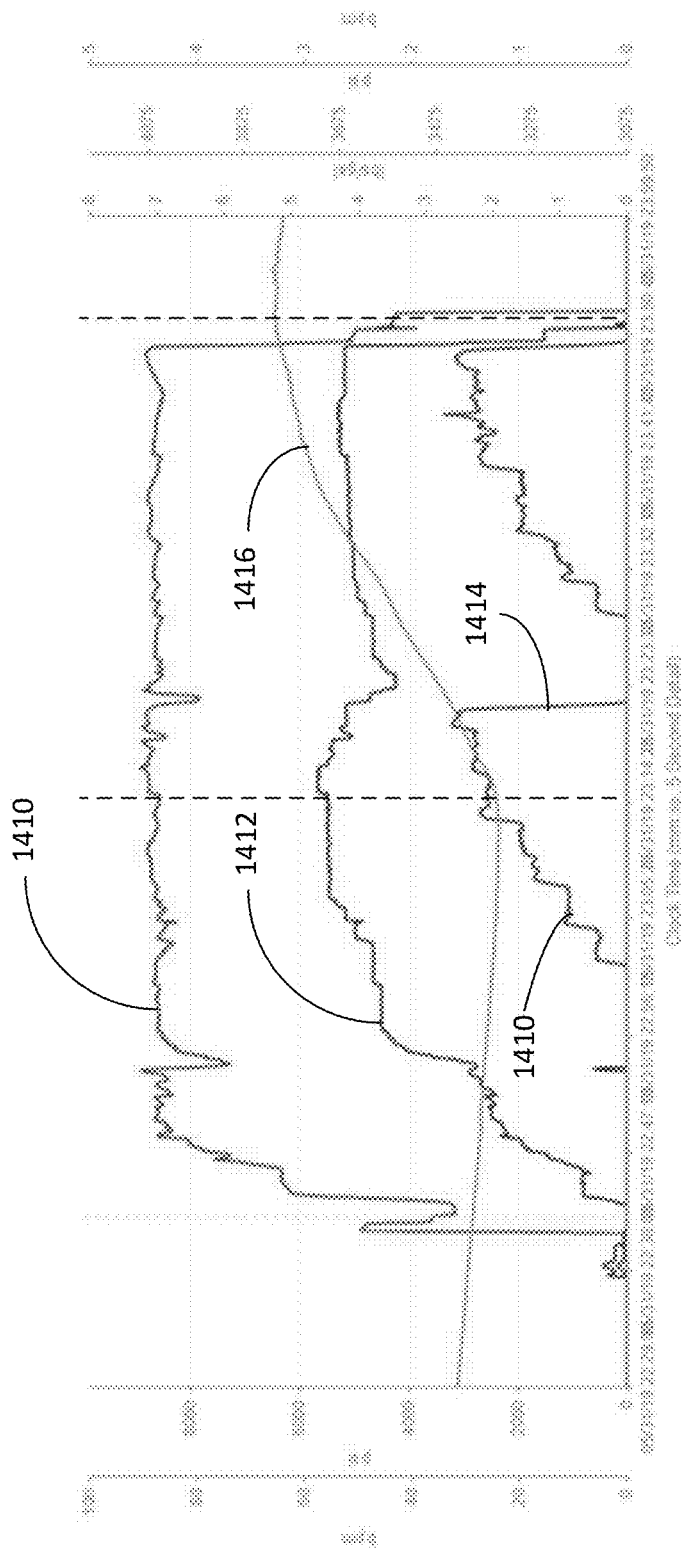
FIG. 14 is a diagram illustrating treating pressure, slurry rate, bottom hole proppant concentration and a curve of the offset pressure response from a legacy well, with the upward inflection in the offset pressure response identified according to the systems discussed herein, with the offset pressure response driven from a fracture interaction, according to one embodiment of the present disclosure.

While some fracture interactions may enhance production, in many instances fracture interactions are undesirable and to be avoided. FDI are strongly influenced by pressure depletion in legacy wells (fractures tend to follow the path of least resistance, and hence to a relatively lower pressure depleted well) and wellbore proximity, which interactions can be observed in real-time by monitoring wellhead pressure of an offset during each hydraulic fracturing stage. As shown in FIG. 14 below, this behavior can be identified by observing a pressure increase in the offset well and may be used during a respective fracturing job to determine any effect on nearby wells.

FIG. 14 is an example of a TP channel 1410, SR channel 1412 and BHPC channel 1414 of an active well with a pressure response channel 1416 of an offset well. Generally speaking, the well is undergoing hydraulic fracturing, and the pressure in an offset well begins increasing suggesting a fracture interaction. The offset pressure response reaches a high value 1'120 and then begins decreasing, shortly after the time that the treating pressure and slurry rate in the well being completed falls to zero. The technique discussed herein identifies when the FDI begins, when it ends, the pressure at the FDI start and the pressure difference between the starting pressure and the pressure when the FDI ends.

In one embodiment, the system is able to recognize an offset pressure FDI response in an offset well while a nearby active well is being hydraulically fractured. For the offset pressure response, the system employs feature engineering to generate an additional higher order channel, in addition to the native treating pressure and offset pressure response channels, and then identifies appropriate channel characteristics indicating a pressure increase in the data for the offset well indicative of an FDI. Generally speaking, the process can be divided into two parts although the process may be conducted without dividing into parts and the order may be changed. The first part detects events (pressure increases) in the offset pressure beginning with no pressure change (e.g., 0 PSI) and filters some upper relatively low pressure responses (e.g., from zero to 350 psi), and the second part detects events (pressure increases) in the offset pressure with relatively large pressure values (e.g., greater than 350 psi) and initiating at some offset pressure greater than zero (e.g., 350 PSI). The second part detects pressure increases at relative high pressures (e.g., 350 PSI or greater). In some instances, lower pressure responses, from 0 PSI to a relatively low pressure (e.g., 350 PSI) are difficult to detect and are often of short duration. Hence, in one example, the system analyzes lower pressure responses in distinct operations.

The data set may include job time (JT) and the pressure in the offset well, which may be, in one example, tubing pressure (TP) (operation 200). The JT is a time axis commonly used for completion data but may be any index, time or otherwise, that correlates the data channels. The JT and TP are used as the basis for the system to generate a new data frame with additional, higher order or otherwise derived channels (operation 202). In one example, the new data frame includes a higher order channel of values with the job time converted to date-time format (channel labeled "filter_time") and a new channel of data values for the second derivative of the offset pressure values (TP"). The second derivative of offset pressure highlights areas with increasing pressure (the second derivate will actually be a negative number) versus areas with no pressure change or falling pressure (zero or positive values).

The legacy (offset) well pressure response technique is intended to recognize a pressure increase in the offset well while fracturing an active well. One key attribute of the technique is for the system to identify a leading edge or initial change of slope of all pressure increases in the offset well. Points on a leading edge of a pressure increase occur when the second derivative of the pressure (tp_2nd or TP") is negative. These points are referred to as events. The technique also involves correlating the events to hydraulic fracturing activity of an active well. Finally, the technique involves determining the pressure response in the offset well, the difference between the pressure from the initial fracture interaction and the highest offset pressure while hydraulic fracturing is occurring.

There are edge cases where the tubing pressure is consistently very low and it is difficult to detect offset pressure responses from fracture interactions. In such cases, the technique isolates and analyzes job times where the tubing pressure is lower than 350 psi. This value can be adjusted to what the industry or operator considers to be a low pressure for a given formation, play, or pad. The algorithm identifies any pressure values that are greater than zero as an event. Events close to one another are merged into intervals and the response flag is placed at the earliest time of each interval.

In more detail relative to the edge case and referring again to the two parts of the process, for the first part addressing the edge case, the new data frame (including the raw and derived higher order channels) may be reduced to retain all the data (e.g., columns or rows of data (JT, filter_time and TP") depending on data frame organization) corresponding with a pressure value (TP) between zero and some upper limit (e.g., 350 psi) and associated with a positive change in pressure in the offset well. For the data frame pertaining to the first part, another new channel, which may be considered a filtered TP channel, is generated based on a determined difference in the index values (e.g., time points, etc.). In one example, any difference that is less than 3600 rows (equating to approximately 3600 seconds or 1 hour) is retained and greater differences are excluded.

Figure 15:
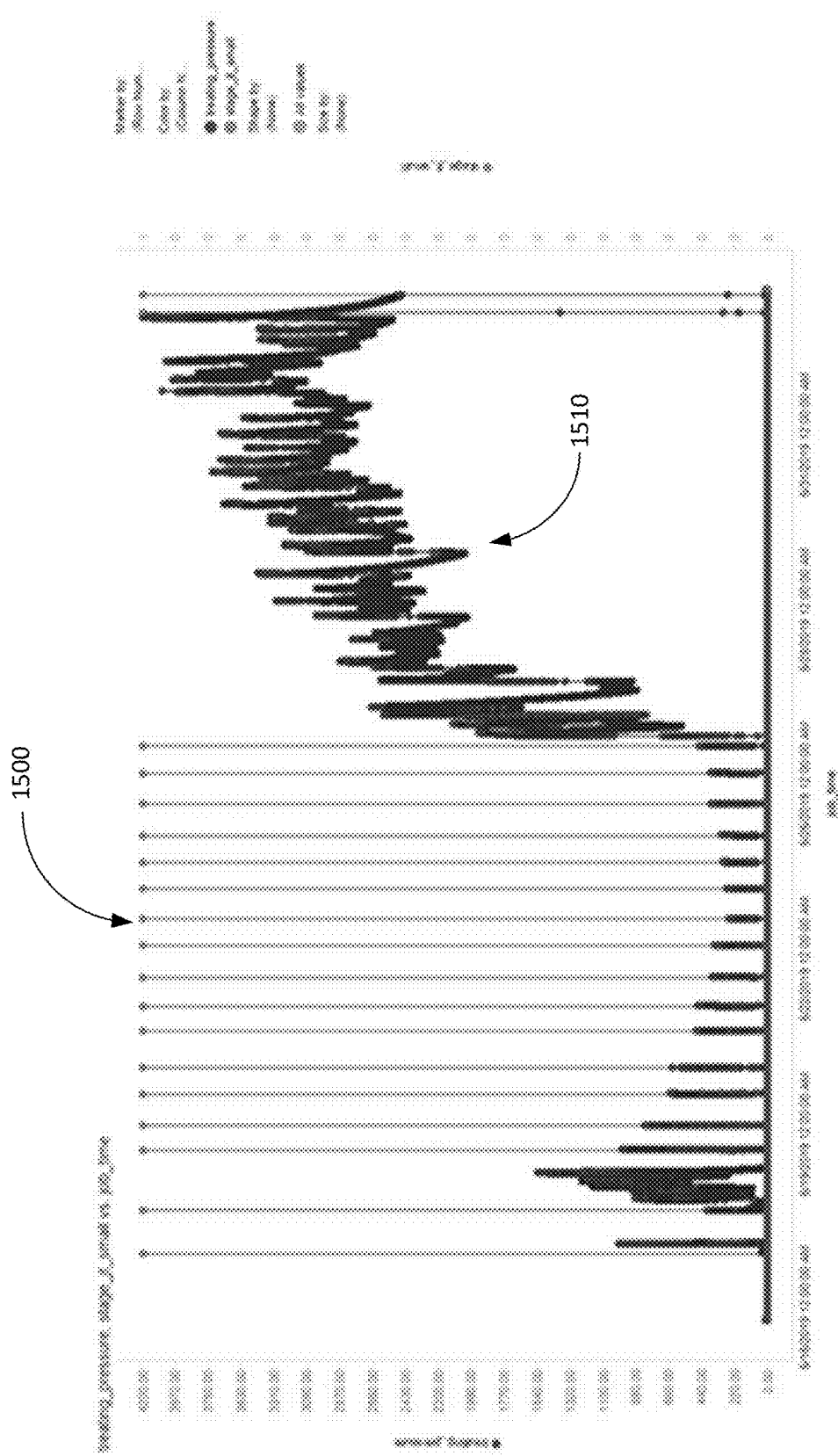
FIG. 15 is a diagram illustrating offset pressure responses for lower order pressure changes, according to one embodiment of the present disclosure.

This TP channel filter eliminates flags that are close to each other and can also be easily optimized. Finally, all events detected within the first part are collected in a partial list (e.g., time_list) that are displayed as flags at each job time. FIG. 15 below shows flagging 1500 of the lower TP that start from zero. Further, it can be seen that higher offset pressure responses 1510, initiating substantially above zero, to the right of the flagged responses are not yet flagged.

The second part (e.g., TP greater than 350 PSI) further filters the original data frame and generates additional channels. A median filter approximately two minutes wide is applied to the offset pressure (e.g., tp_median_filter) and its second derivative channels (e.g., TP" (tp_2nd_median_filter)) to smooth the data and eliminate sensor noise. The system then creates a new data frame filtering out all zero (or close to zero) or positive values from the smoothed second derivative channels (e.g., values_close_to_zero). Thus, the system identifies points on a leading edge of a pressure increase when the second derivative of the pressure (TP") is negative. These points are characterized as events. The system may then merge or otherwise associate events into a group or interval if they are less than the duration of a planned stage (active well) apart from each other (e.g., within 1 hour or 3600 seconds or some other range). If the gap between consecutive events is longer than a planned stage then the latest event marks the beginning of a new group.

In another example, the system may not execute the offset pressure identification in two parts. In the above example, the first part was directed primarily at identifying low magnitude events that may be masked or otherwise difficult for the system to discriminate from noise. In an alternative, the system may apply a shorter duration median filter, e.g., 5 seconds wide, to the offset pressure channel and the second derivative channel. The system then generates a higher order channel retaining negative values of the filtered TP" channel—where the negative values are indicated of a pressure change in the offset pressure. As with above, the system may isolated events into groups correlated with fracturing of an active stage in an active well.

Figure 16:
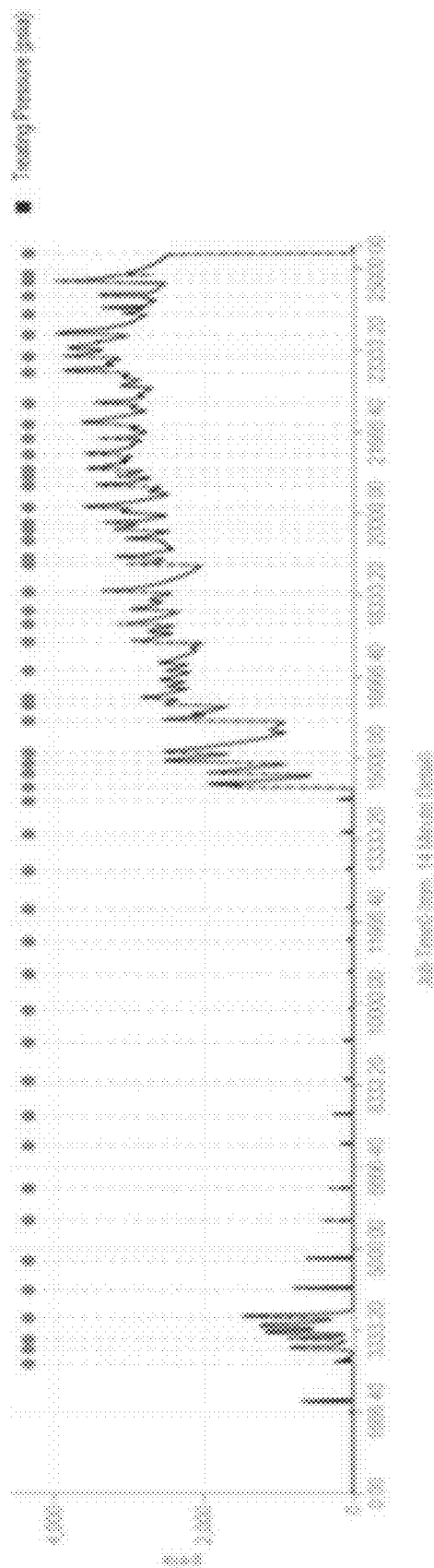
FIG. 16 is a diagram illustrating offset pressure responses in both lower order and higher order pressure changes due to fracture interaction, according to one embodiment of the present disclosure, with the location and degree of fracture interactions able to be used to perform various possible well defense operations to mitigate the effects of, reduce or eliminate the effect of fracture interactions on the active well and/or legacy well.

Once events are located and grouped, the system may select a pressure response flag in a variety of ways. In one example, the system sets the time of the first member in a group as the time of the pressure response. In another example, the system sets the time of the lowest offset pressure as the time of the pressure response. In another example, the system may run a refinement function by generating a new data frame with an initial index located approximately 50 values before the initially selected job time from the prepared partial list of events and a final index based on a selected job time value index. The system selects the minimum value of offset pressure from the new data frame, and a corresponding job time value is selected as a refined job time. FIG. 16 below shows the offset pressure response on an entire offset well across pressure responses at or near zero as well as higher degree pressure responses.

The system may further generate a magnitude of the offset pressure response by calculating the difference between the pressure at the offset pressure time and the maximum offset pressure in a group. In another example, whether or not grouping is used, the system identifies the time at which the second derivative channel of offset pressure is zero following the time of the offset pressure (end boundary). The system obtains the offset pressure for the end boundary time, and determines the magnitude of the fracture driven interaction as the difference between the pressure at the end boundary and the pressure at the start boundary.

Figure 17:
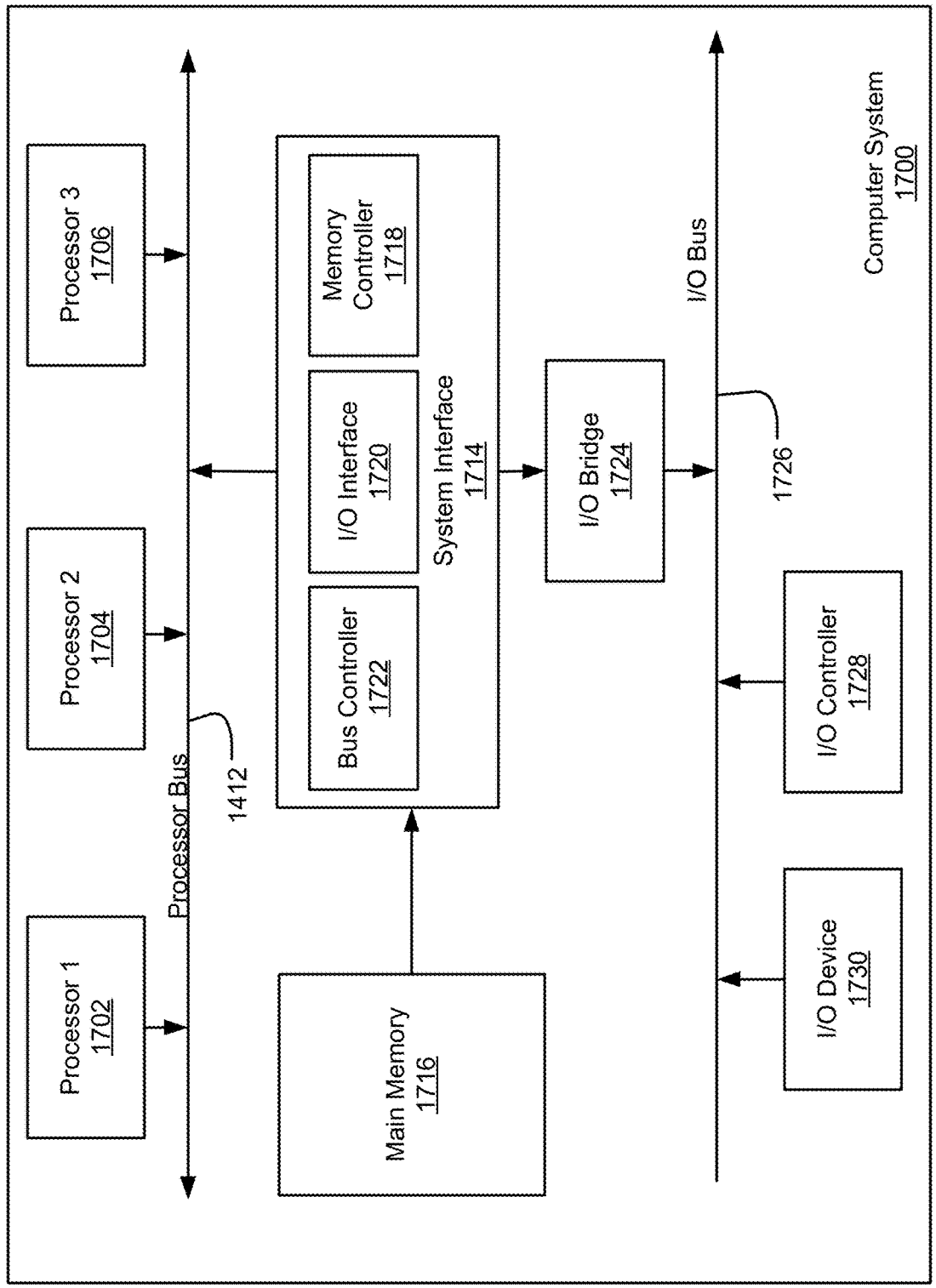
FIG. 17 is a diagram depicting one example of a processing system that may access data, process the data, and produce various possible outputs of the same, according to one embodiment of the present disclosure.

FIG. 17 is a block diagram illustrating an example of a computing device or computer system 1700 which may be used in implementing the embodiments of the processing system disclosed above. The computer system (system) includes one or more processors 1702-1706. Processors 1702-1706 may include one or more internal levels of cache (not shown) and a bus controller or bus interface unit to direct interaction with the processor bus 1712. Processor bus 1412, also known as the host bus or the front side bus, may be used to couple the processors 1702-1706 with the system interface 1714. System interface 1714 may be connected to the processor bus 1712 to interface other components of the system 1700 with the processor bus 1712. For example, system interface 1714 may include a memory controller 1718 for interfacing a main memory 1716 with the processor bus 1712. The main memory 1716 typically includes one or more memory cards and a control circuit (not shown). System interface 1714 may also include an input/output (I/O) interface 1720 to interface one or more I/O bridges or I/O devices with the processor bus 1712. One or more I/O controllers and/or I/O devices may be connected with the I/O bus 1726, such as I/O controller 1728 and I/O device 1730, as illustrated.

I/O device 1730 may also include an input device (not shown), such as an alphanumeric input device, including alphanumeric and other keys for communicating information and/or command selections to the processors 1702-1706. Another type of user input device includes cursor control, such as a mouse, a trackball, or cursor direction keys for communicating direction information and command selections to the processors 1402-1406 and for controlling cursor movement on the display device.

System 1700 may include a dynamic storage device, referred to as main memory 1416, or a random access memory (RAM) or other computer-readable devices coupled to the processor bus 1412 for storing information and instructions to be executed by the processors 1402-1406. Main memory 1416 also may be used for storing temporary variables or other intermediate information during execution of instructions by the processors 1702-1706. System 1400 may include a read only memory (ROM) and/or other static storage device coupled to the processor bus 1712 for storing static information and instructions for the processors 1702-1706. The system set forth in FIG. 17 is but one possible example of a computer system that may employ or be configured in accordance with aspects of the present disclosure.

According to one embodiment, the above techniques may be performed by computer system 1700 in response to processor 1704 executing one or more sequences of one or more instructions contained in main memory 1716. These instructions may be read into main memory 1416 from another machine-readable medium, such as a storage device. Execution of the sequences of instructions contained in main memory 1416 may cause processors 1702-1706 to perform the process operations described herein. In alternative embodiments, circuitry may be used in place of or in combination with the software instructions. Thus, embodiments of the present disclosure may include both hardware and computer executable instruction components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1416. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

The invention claimed is:

1. A non-transitory computer readable medium comprising computer executable instructions that, when executed by a processor, perform following:
   access well data comprising pressure values of a well corresponding to a time when the well is being hydraulically fractured, wherein the well data further includes slurry rate values for the time when the well is being hydraulically fractured;
   generate a series of rate of change of the pressure values for the pressure values;
   generate a series of rate of change of the slurry rate values; and
   identify a peak value from the series of rate of change of pressure values, wherein identifying the peak value includes identifying a breakdown pressure based on the series of rate of change of the pressure values and the series of rate of change of the slurry rate values.

2. The non-transitory computer readable medium of claim 1, wherein the breakdown pressure is identified at the peak value from the series of rate of change of the pressure values when the rate of change of the slurry rate values indicates a substantially constant slurry rate.

3. The non-transitory computer readable medium of claim 1, wherein the breakdown pressure is identified at the peak value when the rate of change of the slurry rate values is substantially zero.

4. The non-transitory computer readable medium of claim 1, wherein:
   the well data further comprises bottomhole proppant concentration values corresponding to the pressure values; and
   the breakdown pressure is identified based on when at least one of the bottomhole proppant concentration values is substantially zero.

5. The non-transitory computer readable medium of claim 1, wherein the instructions, when executed by the processor, further:
apply a smoothing filter to at least one of the pressure values, the slurry rate values, the series of rate of change of the pressure values or the series of rate of change of the slurry rate values, wherein the breakdown pressure is identified based on applying the smoothing filter.

6. The non-transitory computer readable medium of claim 5, wherein the smoothing filter is at least one of a Gaussian moving average or moving median.

7. The non-transitory computer readable medium of claim 1, wherein:
the pressure values are treating pressure values for the well being hydraulically fractured;
the instructions, when executed by the processor, further:
generate a scaled series of the rate of change of the treating pressure values; and
generate a scaled series of the rate of change of the slurry rate values, the scaled series of the rate of change of the treating pressure values being scaled to match the scaled series of corresponding rate of change of the slurry rate values; and
to identify the peak value, the instructions, when executed by the processor, further:
combine the scaled series of the corresponding rate of change of the slurry rate values, with the scaled series of the rate of change of the treating pressure values to yield a combined data channel; and
set a diverter as a highest peak in the combined data channel where the rate of change of the slurry rate values indicates a substantially constant slurry rate.

8. The non-transitory computer readable medium of claim 7, wherein:
the well data includes a series of bottomhole proppant concentration values corresponding to the series of treating pressure values; and
the instructions, when executed by the processor, further:
identify a first set of proppant ramps in the series of bottomhole proppant concentration values;
identify a second set of proppant ramps in the series of bottomhole proppant concentration values; and
set the diverter as the highest peak between the first set of proppant ramps and the second set of proppant ramps.

9. The non-transitory computer readable medium of claim 8, wherein the instructions, when executed by the processor, further:
identify when a rate of change in the series of the bottomhole proppant concentration values between the first set of proppant ramps and the second set of proppant ramps is substantially zero; and
set the diverter at the highest peak when the rate of change in the series of the bottomhole proppant concentration values between the first set of proppant ramps and the second set of proppant ramps is substantially zero.

10. The non-transitory computer readable medium of claim 7, wherein the combined data channel is generated by applying a Gaussian moving average to the combined scaled series to yield a Gaussian moving average channel.

11. The non-transitory computer readable medium of claim 10, wherein the instructions, when executed by the processor, further:
identify a peak in the Gaussian moving average channel; and
generate a diverter induced pressure change value based on a difference in a treating pressure at the peak and a treating pressure at the diverter.

12. The non-transitory computer readable medium of claim 1, wherein:
the pressure values are offset pressure values and the well is an offset well;
the instructions, when executed by the processor, further:
generate a derivate channel for the offset pressure values from the offset well;
identify values in the derivate channel corresponding to a time window when a stage is being completed in the offset well and indicating a positive offset pressure change; and
generate a fracture interference pressure response based on the positive offset pressure change.

13. The non-transitory computer readable medium of claim 12, wherein the instructions, when executed by the processor, generate the fracture interference pressure response from a difference between a low offset pressure within the time window and a high offset pressure within the time window.

14. The non-transitory computer readable medium of claim 12, wherein the instructions, when executed by the processor, further:
remove a second rate of change of treating pressure values that is substantially zero.

* * * * *